US011644573B2

(12) United States Patent
Moore et al.

(10) Patent No.: US 11,644,573 B2
(45) Date of Patent: May 9, 2023

(54) HIGHER PIXEL DENSITY HISTOGRAM TIME OF FLIGHT SENSOR WITH HIGHER PIXEL DENSITY

(71) Applicant: STMicroelectronics (Research & Development) Limited, Marlow (GB)

(72) Inventors: John Kevin Moore, Edinburgh (GB); Neale Dutton, Edinburgh (GB); Jeffrey M. Raynor, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 364 days.

(21) Appl. No.: 17/091,153

(22) Filed: Nov. 6, 2020

(65) Prior Publication Data

US 2021/0080576 A1   Mar. 18, 2021

Related U.S. Application Data

(63) Continuation of application No. 15/786,855, filed on Oct. 18, 2017, now Pat. No. 10,890,662.

(30) Foreign Application Priority Data

Feb. 27, 2017   (EP) .................................... 17158194

(51) Int. Cl.
*G01S 17/26* (2020.01)
*G01S 7/4865* (2020.01)
(Continued)

(52) U.S. Cl.
CPC ................ *G01S 17/26* (2020.01); *G01C 3/08* (2013.01); *G01S 7/4865* (2013.01); *G01S 17/36* (2013.01); *G01S 17/89* (2013.01); *G01S 17/894* (2020.01)

(58) Field of Classification Search
None
See application file for complete search history.

(56) References Cited

U.S. PATENT DOCUMENTS

2007/0182949 A1    8/2007  Niclass
2014/0070867 A1*   3/2014  Dutton ................. G01S 7/4913
                                              327/355
(Continued)

FOREIGN PATENT DOCUMENTS

GB           2485997 A        6/2012

OTHER PUBLICATIONS

Lange, Robert et al: "Solid-State Time-of-Flight Range Camera," IEEE Journal of Quantum Electronics, vol. 37, No. 3, Mar. 2001 (8 pages).

(Continued)

*Primary Examiner* — Eric L Bolda
(74) *Attorney, Agent, or Firm* — Crowe & Dunlevy

(57) ABSTRACT

A distance from an apparatus to at least one object is determined by generating a first signal and generating light modulated by the first signal to be emitted from the apparatus. Light reflected by the at least one object is detected using a Time-of-flight detector array, wherein each array element of the Time-of-flight detector array generates an output signal from a series of photon counts over a number of consecutive non-overlapping time periods. The output signals are compared to the first signal to determine at least one signal phase difference. From this at least one signal phase difference a distance from the apparatus to the at least one object is determined.

20 Claims, 23 Drawing Sheets

(51) Int. Cl.
    *G01S 17/894*     (2020.01)
    *G01S 17/89*     (2020.01)
    *G01C 3/08*     (2006.01)
    *G01S 17/36*     (2006.01)

(56) References Cited

U.S. PATENT DOCUMENTS

2016/0268331 A1* 9/2016 Parmesan .......... H04N 5/37455
2018/0123611 A1* 5/2018 Dutton .................... G01S 17/10
2018/0135980 A1   5/2018 Nakamura et al.
2018/0217241 A1* 8/2018 Mellot .................... G01S 17/10

OTHER PUBLICATIONS

EPO Search Report for EP 17158194.5 dated Aug. 4, 2017 (10 pages).

\* cited by examiner

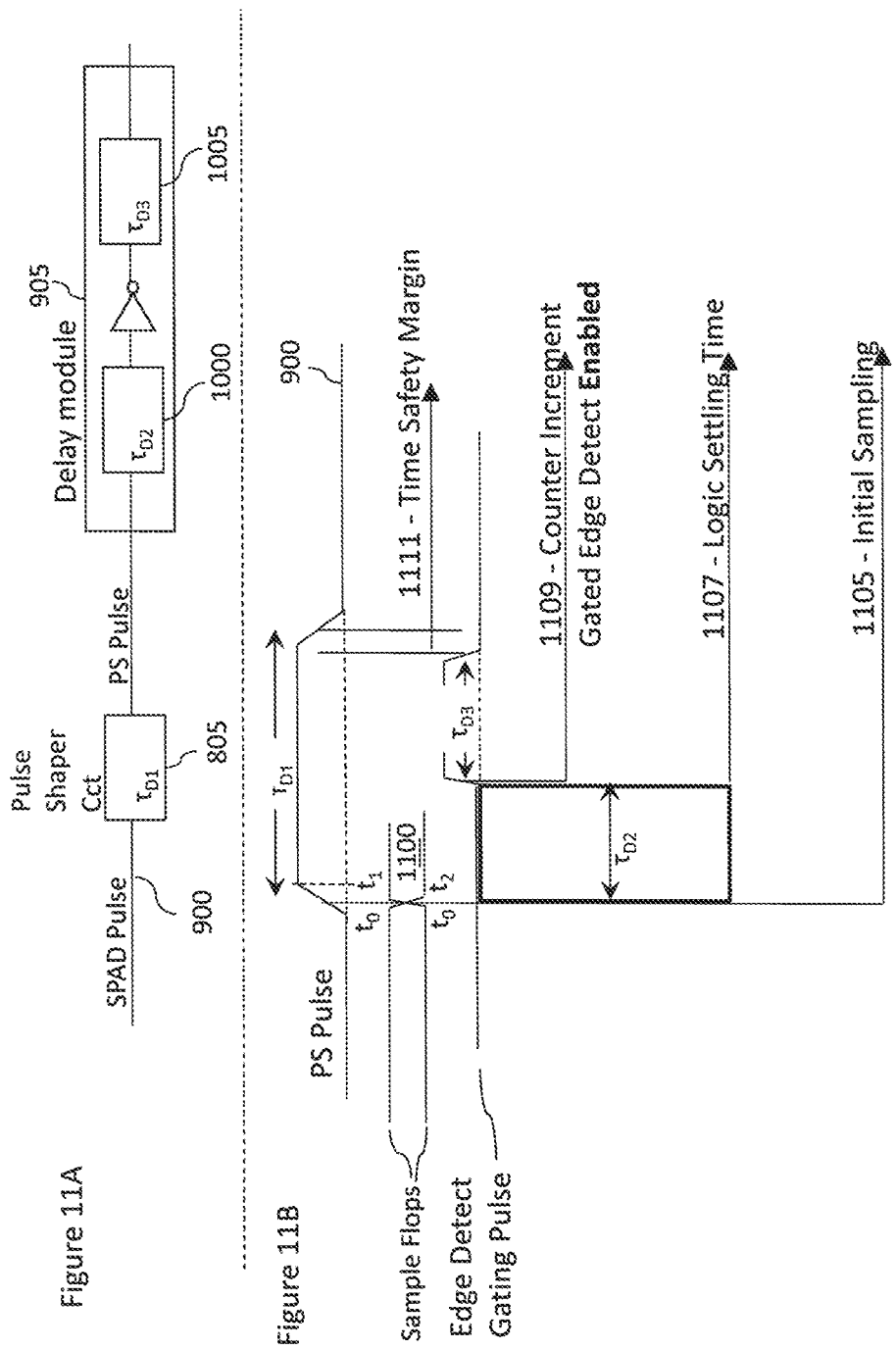

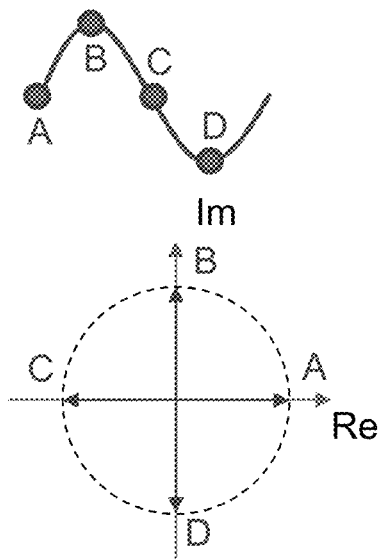
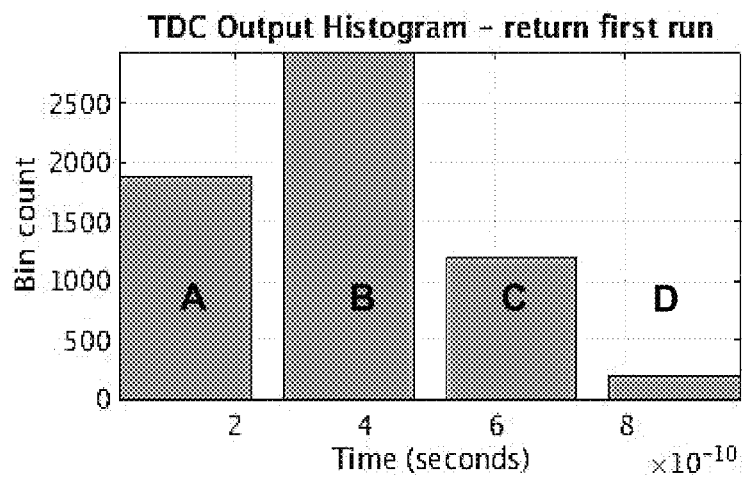
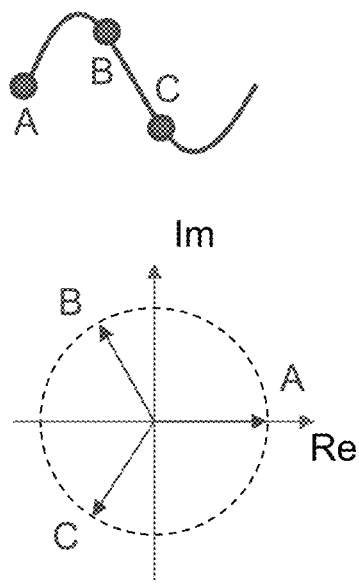
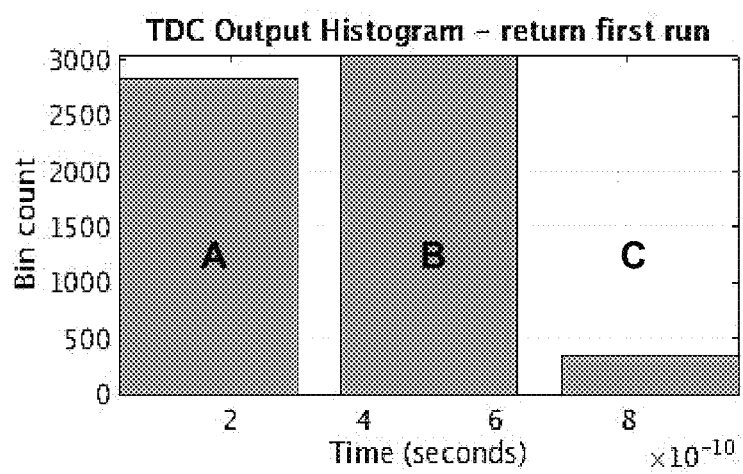
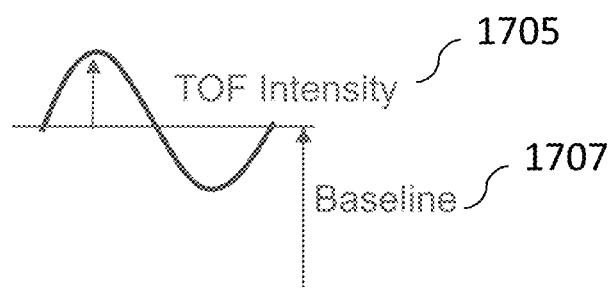
Figure 13B

HIGHER PIXEL DENSITY HISTOGRAM TIME OF FLIGHT SENSOR WITH HIGHER PIXEL DENSITY

CROSS REFERENCE TO RELATED APPLICATIONS

This application is a continuation of U.S. application for patent Ser. No. 15/786,855 filed Oct. 18, 2017, which claims the priority benefit of European Application for Patent No. 17158194.5, filed on Feb. 27, 2017, the disclosures of which are hereby incorporated by reference in their entireties to the maximum extent allowable by law.

TECHNICAL FIELD

Some embodiments relate to an apparatus with histogram time of flight sensors having higher pixel density.

BACKGROUND

Devices for determining the distance to objects are known. One currently used method is called "Time of Flight" (ToF). This method comprises sending a light signal towards the object and measuring the time taken by the signal to travel to the object and back. The calculation of the time taken by the signal for this travel may be obtained by measuring the phase shift between the signal coming out of the light source and the signal reflected from the object and detected by a light sensor. Knowing this phase shift and the speed of light enables the determination of the distance to the object.

Single photon avalanche diodes (SPAD) may be used as a detector of reflected light. In general, an array of SPADs are provided as a sensor in order to detect a reflected light pulse. A photon may generate a carrier in the SPAD through the photo electric effect. The photo generated carrier may trigger an avalanche current in one or more of the SPADs in an SPAD array. The avalanche current may signal an event, namely that a photon of light has been detected.

FIG. 1 illustrates the general principle of a "Time of Flight" method.

In FIG. 1, a generator 10 (shown as box PULSE in FIG. 1) provides a periodic electric signal (for example, square-shaped). This signal powers a light source 12. An example of a light source 12 may be a light-emitting diode, or any known lighting device, for example, a laser diode. The signal coming out of light source 12 is transmitted towards an object 16 and is reflected by this object. The reflected light signal is detected by a light sensor (shown as box CAPT in FIG. 1) 18. The signal on sensor 18, is thus phase-shifted from the signal provided by the generator for an ideal system by a time period proportional to twice the distance to object 16 (in practice there is also electrical to optical delay time from the light source). Calculation block 20 (shown as box DIFF in FIG. 1) receives the signals generated by generator 10 and by sensor 18 and calculates the phase shift between these signals to obtain the distance to object 16. SPADs have the advantage of picosecond time resolution so are ideal for the detector of a compact time of flight pixel.

FIGS. 2A and 2B are timing diagrams illustrating the operation of a circuit such as that in FIG. 1. FIG. 2A illustrates a transmitted periodic signal "PULSE" capable of being provided by the generator 10 of FIG. 1. FIG. 2B illustrates the signal CAPT received by a photo-diode based sensor 18. Due to interactions with the outside and to the components forming sensor 18, the signal received by this sensor has, in this example, variations in the form of capacitor charges and discharges. The signal on sensor 18 is phase-shifted from the signal coming out of generator 10 by a delay D.

The sensor 18 may integrate one or several photo detection elements enabling the detection of the signal received after reflection from the object 16. Such elements may be rapid charge transfer photodiodes. Single-photon avalanche diodes, or "SPADs", also called Geiger mode avalanche photodiodes, may also be used. These devices have a reverse biased p-n junction in which a photo-generated carrier can trigger an avalanche current due to an impact ionization mechanism. SPADs may be designed to operate with a reverse bias voltage well above the breakdown voltage.

SPADs may be operated as follows. At an initial time, the diode is biased to a voltage greater than its breakdown voltage. The reception of a photon in the diode junction area starts a current avalanche in the diode, which creates an electric voltage pulse on the anode. The diode is then biased back to the voltage greater than the breakdown voltage, so that the SPAD reacts again to the reception of a photon. SPADs can currently be used in cycles having reactivation periods shorter than 10 ns. Thereby, SPADs can be used at high frequency to detect objects at relatively short distances from the measurement device, for example, distances ranging from a few centimeters to a few tens of centimeters. In different embodiments, different ranges may be supported.

Digital counter devices intended for histogram comparison, associated with SPAD sensors, are known. However, such devices are relatively complex to implement and require a significant amount of silicon to implement and thus reduce the potential density of pixels in the silicon sensor. Thus, typically the SPAD sensor is a 'few pixels' sensor which has a poor lateral (X-Y dimension) resolution but fine distance (Z dimension) resolution.

The use of high density pixel (or 'many pixel') sensors comprising photodiodes which can transfer charge on several nodes according to the phase of the signal transmitted by the reference generator is also known. These sensors, however, typically have a slow response time and thus produce a poor quality distance resolution but have a good quality lateral resolution.

There is a need for apparatus and methods for sensors which produce both fine quality lateral and distance resolution and which overcome the disadvantages of known devices.

SUMMARY

According to a first aspect there is provided a method for determining a distance from an apparatus to at least one object comprising: generating a first signal; generating light modulated by the first signal from the apparatus; detecting light reflected by the at least one object using a Time-of-flight detector array, by determining by each array element of the Time-of-flight detector array an output signal generated from a series of photon counts over a number of consecutive non-overlapping time periods; comparing the output signals to the first signal to determine at least one signal phase difference; and determining a distance from the apparatus to the at least one object based on the at least one signal phase difference.

Each array element determining an output signal generated from a series of photon counts over a number of consecutive non-overlapping time periods may comprise: sampling a determined number of overlapping clock signals using a photon detection output from the array element, wherein the sampling generates the determined number of sampling outputs; generating the determined number of non-overlapping time periods count increment detections based on outputs from consecutive sampling outputs; phase rotating the determined number of non-overlapping time periods count increment detections to generate phase rotated determined number of non-overlapping time periods count increment detections; and incrementing the series of photon counts from the phase rotated determined number of non-overlapping time periods count increment detections.

Generating the determined number of non-overlapping time periods count increment detections using a gated edge detector based on outputs from consecutive sampling outputs may comprise generating for each determined number of non-overlapping time periods count increment detection by logic-AND combining a first of the determined number of sampling outputs, an inverted second of the determined number of sampling outputs, wherein the first of the determined number of sampling outputs and the second of the determined number of sampling outputs are consecutive sampling outputs generated based on overlapping clock signals.

Generating the determined number of non-overlapping time periods count increment detections based on outputs from consecutive sampling outputs may comprise gating the determined number of non-overlapping time periods count increment detections based on a delayed detected photon output.

Phase rotating the determined number of non-overlapping time periods count increment detections to generate phase rotated determined number of non-overlapping time periods count increment detections may comprise multiplexing each of the determined number of non-overlapping time periods count increment detections to a determined counter based on a phase determination input such that after all phases have been completed each determined counter has been coupled to each of the non-overlapping time periods count increment detections.

The method may further comprise: generating at least one further signal, wherein the at least one further signal has a frequency component different to a first signal frequency component; generating light modulated by the at least one further signal from the apparatus; detecting light reflected by the at least one object using the Time-of-flight detector array, by determining by each array element of the Time-of-flight detector array an at least one further signal related output signal generated from a series of photon counts over a number of consecutive non-overlapping time periods; comparing the at least one further signal related output signal to the first signal to determine at least one further signal phase difference; determining a distance from the apparatus to the at least one object based on the at least one further signal phase difference; and determining an unambiguous distance from the apparatus to the at least one object based on the determined distance based on the at least one further signal phase difference and the determined distance based on the signal phase difference.

The method may further comprise determining at least one array element co-ordinate associated with at least one of the Time-of-flight detector array elements which provided the output signal determining the distance.

The method may further comprise determining a user input gesture from the at least one array element coordinate and the distance from the apparatus to the at least one object.

According to a second aspect there is provided an apparatus for determining a distance to at least one object, the apparatus comprising: a signal generator configured to generate a first signal; a light source configured to generate light modulated by the first signal; a time-of-flight detector array configured to detect light reflected by the at least one object, the time-of-flight detector comprising an array of detector elements configured to generate an output signal, the output signal generated from a series of photon detections over a determined number of consecutive non-overlapping time periods; a comparator configured to compare the output signals from each detector element to the first signal to determine at least one signal phase difference; and a distance determiner configured to determine at least one object distance based on the at least one signal phase difference.

Each detector array element may comprise: a plurality of single-photon-avalanche-diodes configured to generate a photon detection output; and a histogram generator configured to generate the series of photon detections over the determined number of consecutive non-overlapping time periods.

The plurality of single-photon-avalanche-diodes configured to generate a photon detection output and the histogram generator may be integrated.

The histogram generator may comprise: the determined number of clock sampling flip flops configured to sample a determined number of overlapping clock signals using the photon detection output from the array element and generate the determined number of sampling outputs; the determined number of edge detectors configured to generate the determined number of non-overlapping time periods count increment detections based on outputs from consecutive clock sampling flip flops; the determined number of multiplexers configured to phase rotate the determined number of non-overlapping time periods count increment detections to generate phase rotated determined number of non-overlapping time periods count increment detections; and the determined number of counters configured to increment the series of photon counts based on the phase rotated determined number of non-overlapping time periods count increment detections.

The determined number of edge detectors may comprise the determined number of AND-gates configured to combine a first of the determined number of sampling outputs and an inverted second of the determined number of sampling outputs, wherein the first of the determined number of sampling outputs and the second of the determined number of sampling outputs may be consecutive sampling outputs generated based on overlapping clock signals.

The determined number of edge detectors may be further gated based on a delayed photon detection output.

The determined number of multiplexers may be configured to multiplex each of the determined number of non-overlapping time periods count increment detections to each counter based on a phase determination input such that after all phases have been completed each counter has been coupled to each of the non-overlapping time periods count increment detections.

The signal generator may furthermore be configured to generate at least one further signal, wherein the at least one further signal has a frequency component different to a first signal frequency component.

The light source may furthermore be configured to generate light modulated by the at least one further signal from the apparatus.

The time-of flight detector may furthermore be configured to detect light modulated by the at least one further signal from the apparatus and reflected by the at least one object using the Time-of-flight detector array by the array of detector elements configured to generate an further output signal.

The comparator may be configured to compare the at least one further output signal to the further signal to determine at least one further signal phase difference.

The distance determiner may be configured to determine at least one further distance based on the at least one further signal phase difference.

The distance determiner may be configured to determine an unambiguous distance based on the determined distance based on the at least one further signal phase difference and the determined distance based on the signal phase difference.

The apparatus may furthermore comprise a processor configured to determine at least one array element co-ordinate associated with at least one of the Time-of-flight detector array elements which provided the output signal determining the at least one distance.

The processor may furthermore be configured to determine a user input gesture from the at least one array element co-ordinate and the distance from the apparatus to the at least one object.

The light source may be a vertical cavity surface emitting laser.

The apparatus may comprise a phase rotator configured to control the determined number of multiplexers.

The first signal may be at least one of: a sine wave with a frequency component; a square wave; an irregular wave with at least one defined frequency component; a pulse wave; and a regular wave with at least one defined frequency component.

The at least one further signal may be at least one of: a sine wave with a frequency component; a square wave; an irregular wave with at least one defined frequency component; a pulse wave; and a regular wave with at least one defined frequency component.

The determined number is three or four.

BRIEF DESCRIPTION OF THE DRAWINGS

Some embodiments will now be described by way of example only and with reference to the accompanying Figures in which:

FIG. 11A shows a schematic view of an example delay module shown in FIG. 8;

FIG. 11B shows an example timing diagram illustrating the function of the delay module shown in FIG. 8;

FIG. 13B shows example methods for signal reconstruction according to some embodiments;

DETAILED DESCRIPTION

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Figure 1:
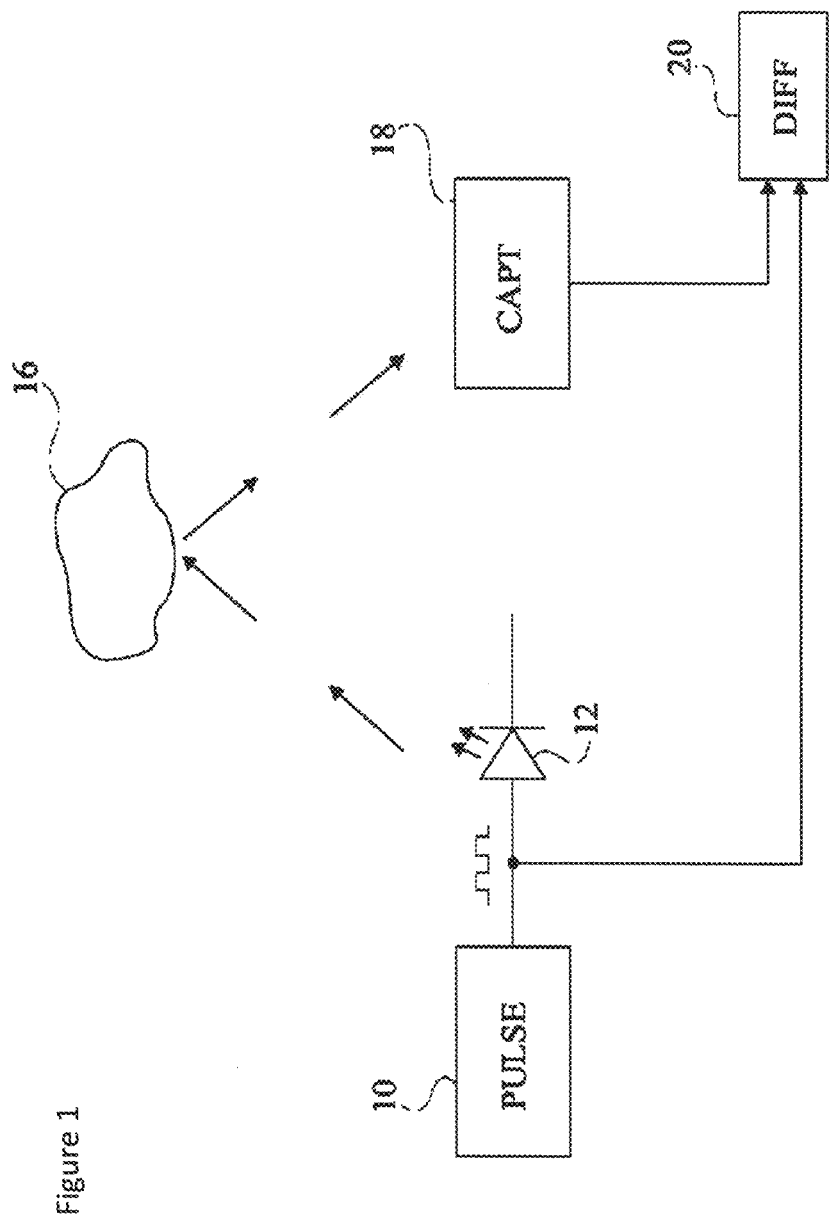
FIG. 1 illustrates principle of the "Time of Flight" method for determining the distance to an object.
Figure 2:
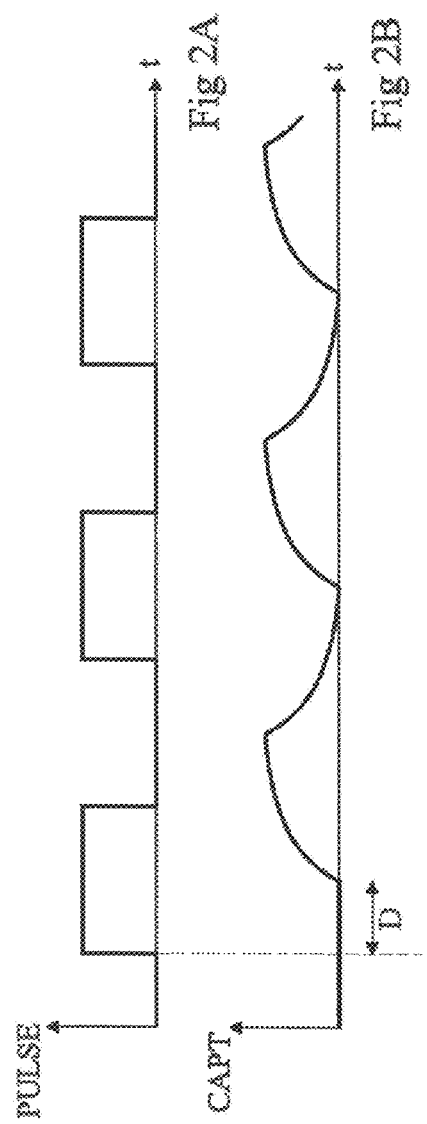
FIGS. 2A and 2B are timing diagrams illustrating results obtained by means of the device of FIG. 1, as well the operation of "SPADs"
Figure 3:
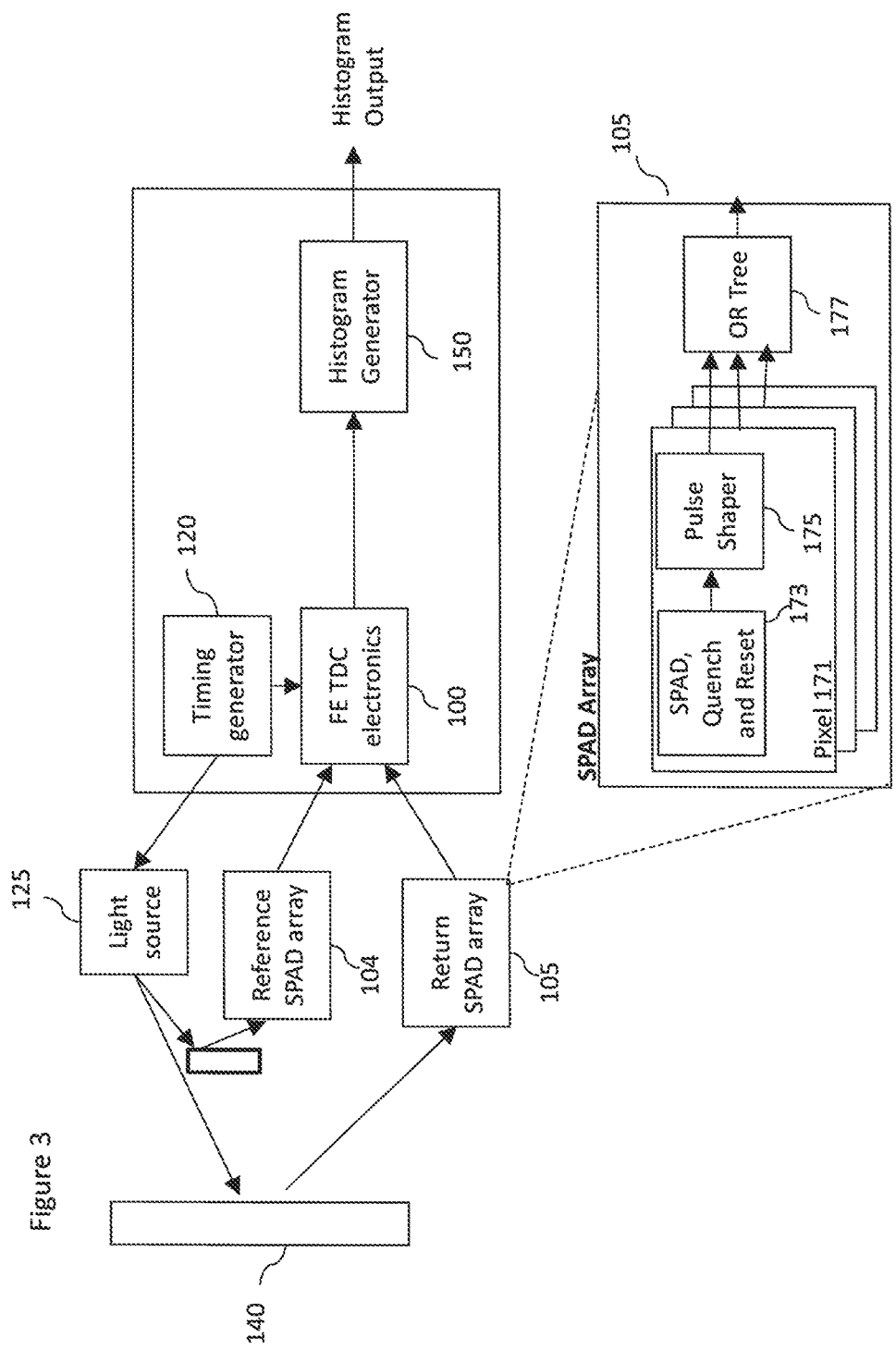
FIG. 3 shows a block diagram of a few-pixel many-bin histogram generating detector arrangement.

Reference is now made to FIG. 3 which shows a block diagram of a few-pixel many-bin histogram generating time-of-flight range detector arrangement. To measure the time of flight at a resolution below a clock period, a flash time to digital converter (TDC) is typically used. This typically comprises a multiple-phase timing generator and front end sampling elements. There are two input TDC channels, one input for reception of SPAD pulses (i.e. pulses generated by a SPAD on detection of a photon) and the other input for illumination device pulses (i.e. pulses generated by the system coincident with emission of an illumination pulse). The TDC converts the time difference between a received SPAD event and the multiple clock phase timing generator.

The system shown in FIG. 3 comprises a timing generator 120. The timing generator generates a timing signal which may be used to control a light source (and furthermore be used as a reference clock signal). The timing generator 120 may be configured to generate suitable timing pulses.

The system may furthermore comprise a light source 125. The light source 125 may comprise any suitable fast light source, for example a vertical cavity surface emitting laser (VCSEL), a light emitting diode (LED), etc. The light source 125 may receive signals from the timing generator and be configured to generate light based on the signals. For example, the light source 125 may be configured to receive timing signal pulses from the timing generator 120 and generate pulses of light which are emitted externally (and in some embodiments internally via an internal parasitic path directly to a reference SPAD array 104).

The system may further comprise a detector. In the example shown in FIG. 3, the detector may comprise a first or reference SPAD array 104 and a second or return SPAD array 105. The return SPAD array 105 may configured to detect light reflected back from the object 140 whereas the reference SPAD array 104 may be configured to detect light passed via the internal parasitic path only. The output of the SPAD arrays (the reference SPAD array 104 and the return SPAD array 105) may be coupled to front end electronics (FE electronics) 100.

An example of the SPAD array 105 architecture is further shown in FIG. 3. In this example the SPAD array 105 comprises an array of pixels, of which one pixel 171 is shown in further detail.

Each pixel 171 may as shown in FIG. 3 comprise a single photon avalanche diode with quench and reset components 173. The output of the pixel single photon avalanche diode 173 may be passed to a pulse shaper.

The system comprises a pulse shaper 175 per pixel, which receives the input SPAD pulse from each pixel and performs pulse shaping on the signal. The pulse shaper may be configured to shorten the pulse length and reduce the effect of pileup distortion in the OR tree network, for a given SPAD count rate. The pulse output from the SPAD array may be greater than 10 ns in length. The longer the period or length of pulses entering the input of an OR tree (used in the histogram generator), the more likely it is for two or more SPAD outputs to be high together. One SPAD array output being high has the same effect at the output as two or more SPAD array outputs being high. In both cases the output of the OR tree sits high. Accordingly, timing information can be lost as output pulses increase in length. This effect is sometimes referred to as pile up distortion. The pulse shaping circuitry is used to overcome this. The output of the pulse shaper may be passed to the OR tree.

Although not shown in detail the reference SPAD array 104 may be similarly arranged.

As shown in FIG. 3 each pixel is configured to output to the OR tree 177, which receives the output from each pixel pulse shaper 175 and logically 'OR's the inputs to generate a pulse output. The output of the OR tree 177 and therefore the return SPAD array 105 may be passed to the Front End (FE) time-to-distance (TDC) electronics 100.

The FE TDC electronics 100 may be configured to receive signals from the timing generator 120, the reference SPAD array 104 and the return SPAD array 105 and pass these signals to a histogram generator 150.

The system in some embodiments comprises a histogram generator 150. The histogram generator 150 measures the time of flight of the illumination pulse over the return journey from light source 125 to object 140 and back to the return SPAD array 105. The histogram generator 150 in this type of arrangement may comprise clocked counters which output a large number of bins each of which comprise the number of detected events for a clocked period.

Figure 4B:
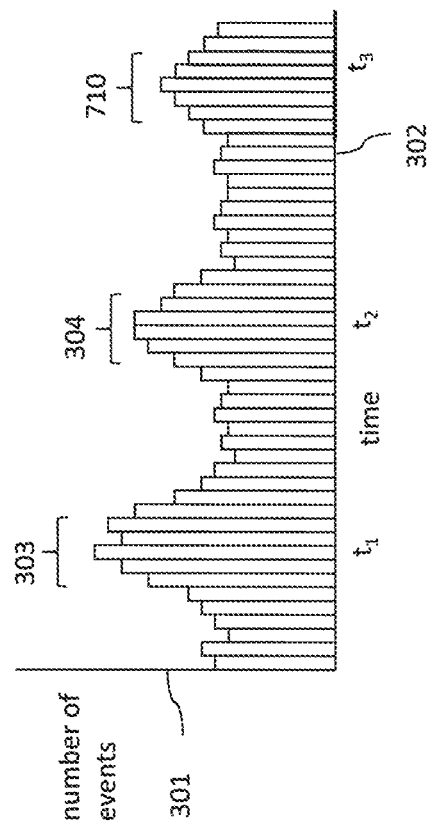
FIG. 4B shows an example of a many bin histogram output produced by the few-pixel many-bin histogram generating detector arrangement shown in FIG. 3.
Figure 4A:
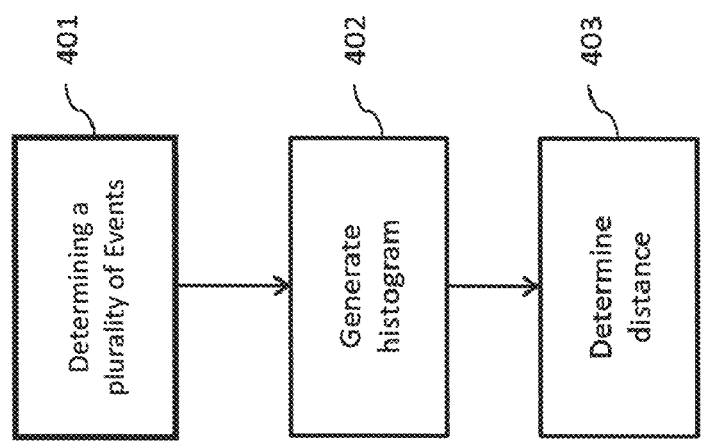
FIG. 4A shows a flowchart illustrating the function of the many-bin histogram generating detector arrangement shown in FIG. 3.

Reference is now made to FIG. 4A which shows a flow chart illustrating the method steps associated with the function of a conventional SPAD arrangement such as the one shown in FIG. 3.

At step 401, a plurality of events are determined and a time at which each event occurred is recorded.

At step 402, a histogram may be generated from the event information. Typically, the histogram may be generated during the detection period and based on all the time and event information for the detection period. Typically, the histogram is generated by the histogram generator. An illustrative example of such a histogram is shown in FIG. 4B.

Thus, for example, FIG. 4B shows an example histogram where the Y-axis 301 shows the number of events for each histogram bin 302. FIG. 4B, for example, shows at time $t_1$ a first peak 303 corresponding to a first detected event, at time $t_2$ a second peak 304 corresponding to a second detected event, and at a time $t_3$ a third peak 710 corresponding to a third detected event. In this example the first peak 303 may correspond to the internal parasitic path event detection, the second peak 304 the may correspond to external object detection and the third peak may correspond to a further distant reflected object detection.

At step 403, the time of the first peak 303 $t_1$, the second peak 304 $t_2$ and the third peak 710 $t_3$ may be used to determine a time taken for light to travel to and from the respective remote objects.

A drawback of the architecture described above with reference to FIGS. 3 and 4A is that the histogram generator circuitry configured to output multiple bin histograms requires a large amount of implementation physical space. As a histogram is required for each of the arrays (or pixels) the number of detector pixels (or arrays) which may be implemented on a suitable silicon device is therefore limited. Hence, most practical implementations are typically only able to output a few pixels. Thus, although such devices are able to provide fine resolution in the Z dimension (in other words the plane perpendicular to the sensor), they offer coarse resolution in the X-Y plane (the plane parallel to the sensor).

Figure 5:
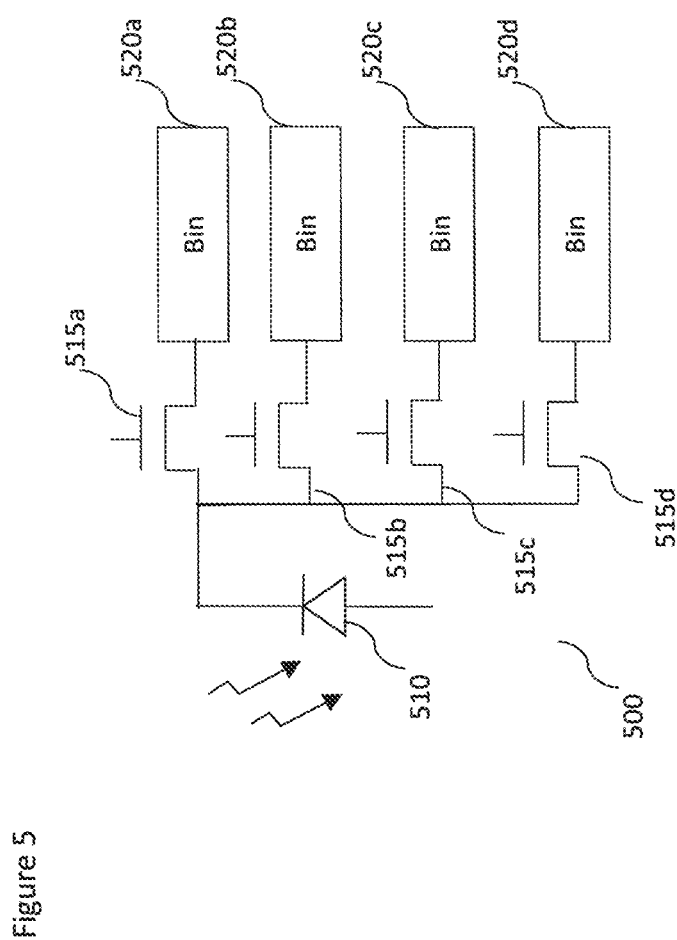
FIG. 5 shows a circuit of a many-pixel few-bin histogram generating detector arrangement.

Reference is now made to FIG. 5 which shows a further example of the detector architecture 'many-pixel few-bin' implementation. The example shows where the complexity of the circuitry is reduced to enable an increase in the density of pixels. In this example the sensor comprises a photodiode 510. The photodiode 510 may be reversely biased close to a breakdown voltage. Once the photodiode is triggered by few photons, a current may be generated. The photodiode 510 is connected to a pass circuit comprising several transistors, 515*a*, 515*b*, 515*c* and 515*d*, configured in a pass transistor configuration. Each transistor is clocked by at least one clock which is passed to a delay line and the taps from which are used to activate each transistor such that one terminal is connected to the photodiode and the other is connected to a charge collection region or 'bin' 520*a*, 520*b*, 520*c* and 520*d* respectively. The advantage of this example detector is that the reduction in complexity is such that the amount of silicon required per pixel is low and therefore a higher resolution can be achieved. However, the use of pass gate logic is disadvantageous because it introduces an inherent delay to the system which significantly limits the maximum frequency of the transmitted illumination. This results in a slow system which cannot take full advantage of the speed offered by the SPAD diodes and is more limited by any differences between pass-gate transistor to pass-gate transistor. Hence, the example implementation although suitable for producing a fine resolution in the X-Y dimension (due to the number of pixels), offers limited resolution in the Z plane and furthermore limited resolution in the time domain.

Figure 6:
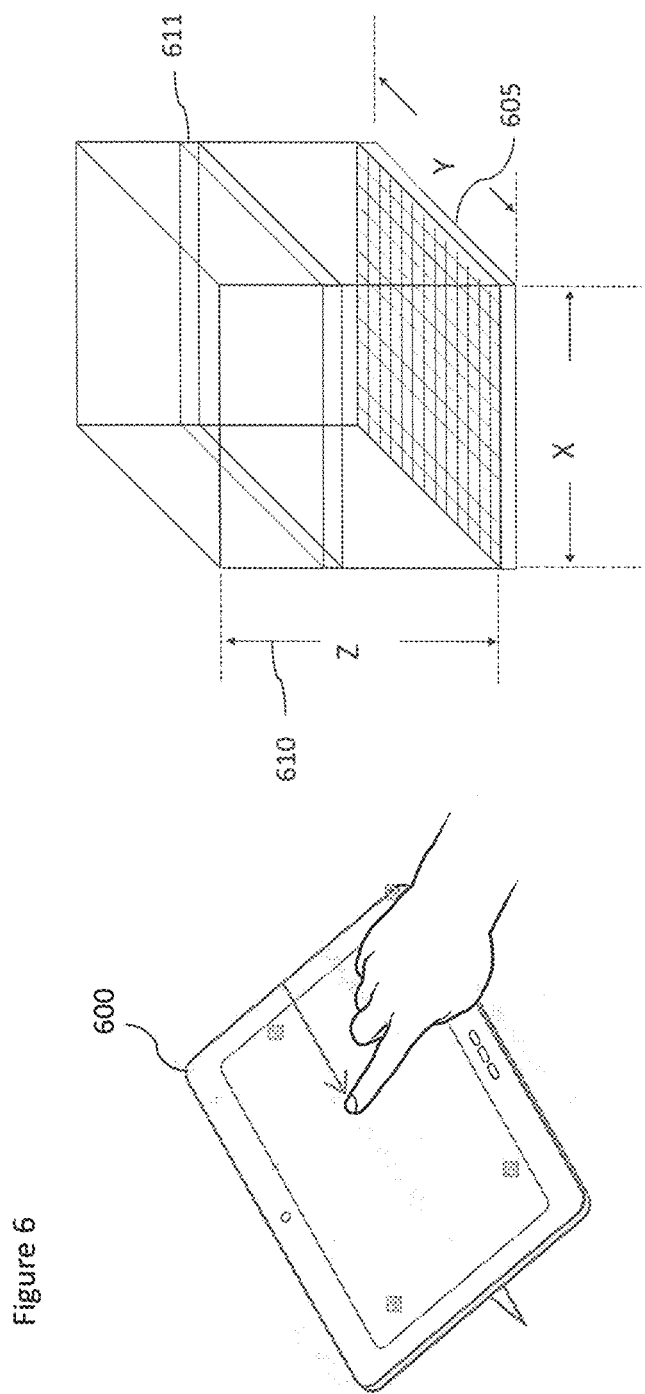
FIG. 6 shows suitable applications for time of flight detectors according to some embodiments.

There are certain applications for which a high degree of accuracy in distance measurements, without any loss of accuracy in the X-Y plane domain, is required. An example of these applications include gesture recognition. An example representation of a gesture recognition device is schematically shown in FIG. 6. FIG. 6 shows for example an electronic device 600 with display, suitable for implementing a '3D mouse' application where the user's hand or other object is monitored and used to provide an input for the device. For example in such an application the device may be configured to detect objects (for example a finger of a hand) located over the device and the motion of the object (shown as the finger moving from the right to the left to attempt a 'swipe' gesture) is detected and used to control the device. In such applications not only is it not necessary to contact the device to enable the user input but the distance from the device (Z-distance) may itself be detected and any change in the Z-distance be used to determine a suitable input to the device. For example a single point zoom effect input may be determined based on the 'input' object distance from the device where the closer the object to the device the higher the zoom magnification and vice versa.

In other words the recognition of some gestures requires knowledge of not only x-y coordinates (as per optical mouse techniques), but also an array of z coordinates. Examples of this are diagonal gestures where there is motion or displacement of the object being detected in the x-y coordinates and the z distance. Other examples are circular gestures such as looping with a hand, turning a hand over or more complex gestures such as detecting a turning dial gesture. In all of these the change in z distance is to be detected.

Thus, in order to be able to produce effective 3D gesture recognition an object detection sensor is required to have both a fine spatial resolution (X-Y axes) 605 that is high enough for gesture recognition in two-dimensions, while also being able to accurately resolve in the Z axis 610. For example, the device is required to distinguish between a motion of the 'target' object (within a height range 611) and a different object detected at a different height. In other words, being able to be quick enough both to provide a high enough frame rate and to obtain the required precision in the Z axis. Furthermore, by providing a device with a good Z axis resolution, three dimensional gesture detection can be implemented accurately.

By way of example, an optical mouse typically uses a 20×20 two-dimensional array of detectors operated at approximately 1000 fps (frames per second) to detect movement direction and speed.

Figure 7:
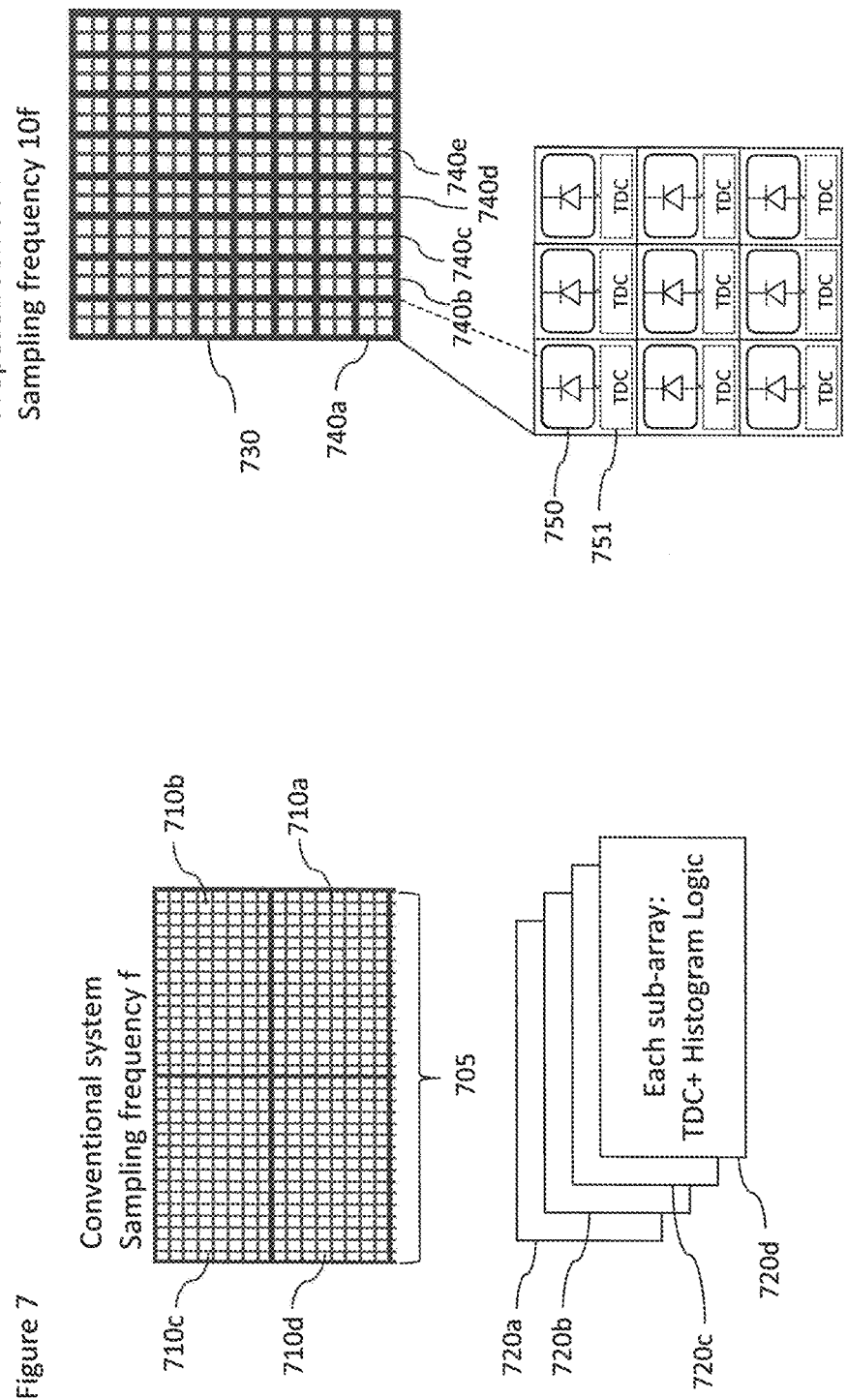
FIG. 7 shows schematically an example arrangement for a few-pixel many-bin detector and the many-pixel few-bin detector according to some embodiments.

With respect to FIG. 7, an example arrangement for both the few-pixel many-bin detector described above and the many-pixel few-bin detector according to some embodiments are shown. The left hand side of FIG. 7 shows the few-pixel many-bin detector. As can be seen, conventional architectures 705 use an array of SPADs which are divided into sub-arrays of SPADs. In this example the array of SPADs is divided into four sub-arrays 710a, 710b, 710c, 710d to achieve the required resolution. Each sub-array of SPADs 710a, 710b, 710c, 710d is associated with its own histogram logic 720a, 720b, 720c, 720d. As discussed previously this is not a practical solution as the silicon area required for this histogram logic is relatively large, thus the resulting circuits would require large areas of silicon and would be inefficient, expensive and difficult to make with a high yield.

By contrast the right hand side of FIG. 7 shows an example of the proposed solution. In this system the SPAD array 730 is divided into macro pixels 740 which comprise smaller sub-arrays of SPADs. In the example system 730 each macro pixel 740a, 740b, 740c, 740d, 740e is depicted by a bold square. The macro pixels are further shown on the right hand of FIG. 7 wherein each macro pixel comprises a sub-array 750 of SPADs and associated sub-array of SPADs TDC component 751, which may comprise an OR tree, pulse shaper and 'few-bin' histogram generator. In some embodiments the example TDC component 751 and the 'few-bin' histogram generator is physically located on the integrated circuit adjacent the SPAD sub-array 750. In some embodiments the 'few-bin' histogram generator 751 is physically located adjacent to the SPAD sub-array 750 in the X or Y plane of the device (in other words within the same silicon layers as the SPAD detectors) or in the Z plane (in other words in different silicon layers as the SPAD detectors).

Figure 8:
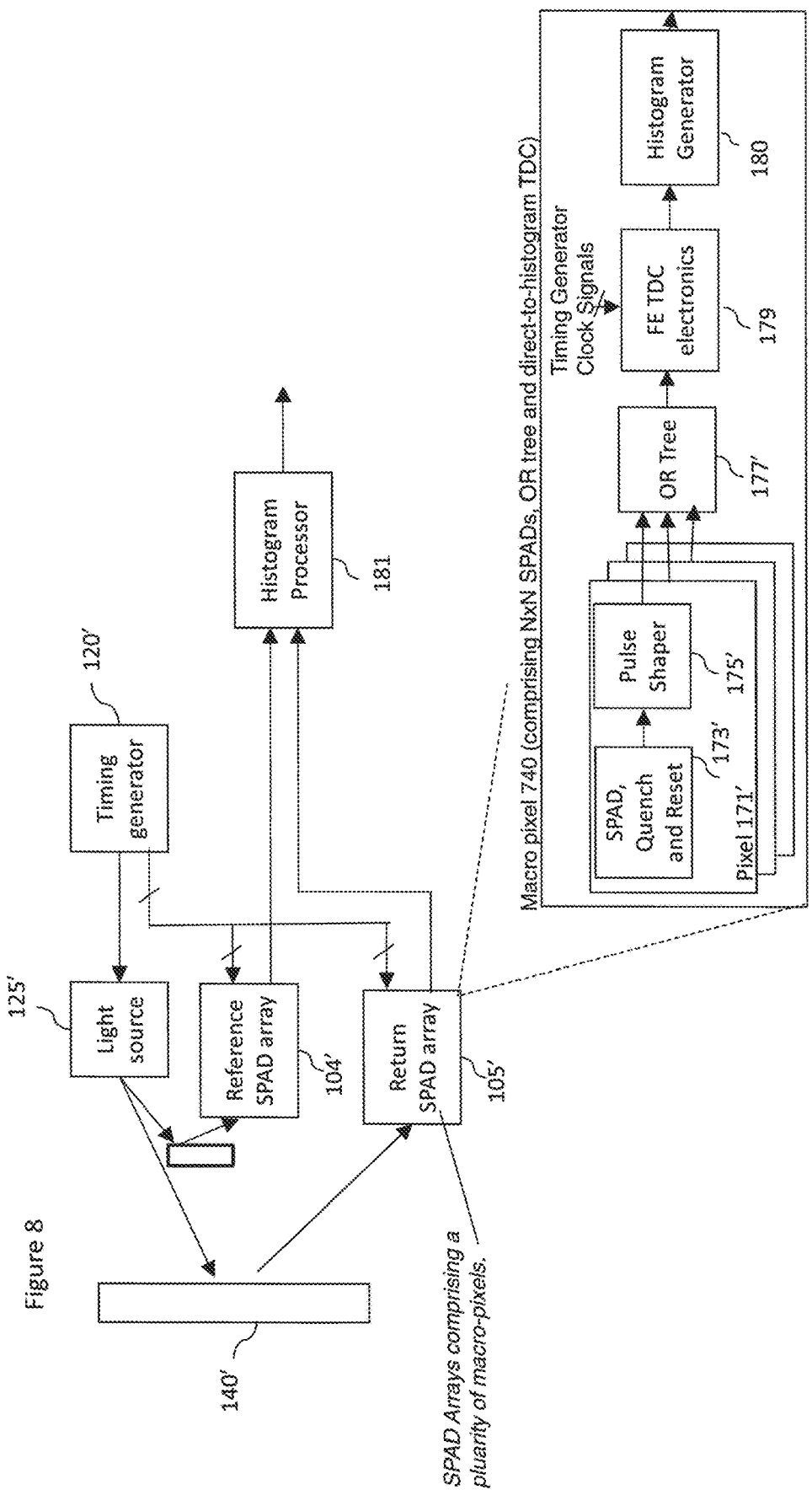
FIG. 8 shows schematically a block diagram of the many-pixel few-bin detector according to some embodiments.

Reference is now made to FIG. 8 which shows a block diagram of a time-of-flight range determining device in accordance with some embodiments.

The ToF range determining device comprises a timing generator 120'. The timing generator 120' is configured to control the timing of a light source 125' and furthermore in some embodiments to generate a known waveform for controlling the light source 125'. The following examples are described where the timing generator 120' is configured to generate a sine wave at a determined frequency f. In some other embodiments the known waveform may be any arbitrary waveform, for example a pulse wave, triangle wave, square wave, saw tooth wave or other.

The ToF range determining device comprises a light source 125'. The light source 125' may comprise any suitable fast switching light source, for example a vertical cavity surface emitting laser (VCSEL), a light emitting diode (LED), etc. The light source 125' for example may be configured to emit light which is amplitude modulated at a sine wave at the frequency f and time controlled by the timing generator 120'. The light is then reflected back from an object 140'.

The ToF range determining device further comprises a first or reference SPAD array 104' and a second or return SPAD array 105'. The return SPAD array 105' may be configured to detect light reflected back from the object 140' whereas the reference SPAD array 104' may be configured to detect light passed via the internal parasitic path only. The output of the SPAD arrays (the reference SPAD array 104' and the return SPAD array 105') may be coupled to histogram processor 181.

An example of the SPAD array 105' architecture and an example configuration of a macro pixel 740 is further shown in FIG. 8. In this example the SPAD array 105' comprises an array of macro pixels 740. Each macro pixel 740 is shown comprising a N×N SPAD pixel arrangement of which one pixel 171' is shown in further detail and which outputs to the OR Tree 177'.

Each pixel arrangement 171' as shown in FIG. 8 may comprise a single photon avalanche diode with quench and reset components 173'. The output of the pixel single photon avalanche diode 173' (with quench and reset components) may be passed to a pulse shaper 175'. Each pixel arrangement 171' may further comprise a pulse shaper 175', which receives the SPAD pulse from each pixel and performs pulse shaping on the signal. The pulse shaper may, as described previously, be configured to shorten the pulse length and reduce the effect of pileup distortion in the OR tree network, for a given SPAD count rate. The output of the pulse shaper 175' may be passed to the OR tree 177'.

The SPAD pixel arrangement 171' is configured to receive the reflected sine wave from the object 140' and generate detected event signal pulses.

The macro pixel 740 may further comprise an OR tree 177', which is configured to receive the output from each pixel pulse shaper 175' for the macro pixel 740 and logical 'OR' the inputs to generate a pulse output. The output of the OR tree 177' and therefore the detected reflected sine wave may be passed to the Front End (FE) time-to-distance (TDC) electronics 179.

The macro pixel 740 may further comprise FE TDC electronics 179 configured to receive signals from the timing generator 120 and the OR tree 177 and pass these signals to a 'few-bin' histogram generator 180.

The macro pixel 740 may further comprise a 'few-bin' histogram generator 180, configured to receive the output of the FE TDC electronics 179 and output a histogram. The histogram generator 180 is configured to generate a histogram comprising a small number of bins. For example, by way of non-limiting examples, the histogram generator 180 described hereafter is configured to generate 3 bins or 4 bins. However it is understood that in some embodiments more than 4 bins may be generated. These histogram bin values may be passed to a histogram processor 181.

Although not shown in detail the reference SPAD array 104' may be similarly arranged.

The ToF range determining device further comprises a histogram processor 181. The histogram processor 181 may be configured to receive the output of the histogram generator 180 from each macro pixel 740 of the Return SPAD array 105' and the output of the Reference SPAD array 104'. The histogram processor 181 may be configured to regenerate from the determined 'few-bin' histogram data a reconstructed sinewave. This reconstructed sinewave may then be compared with the sine waveform from the timing generator 120' and a phase difference between the two waveforms may be determined. From this phase difference (between the timing generator 120' sine wave and the reconstructed sinewave an estimate of the range may be determined.

In some embodiments the timing generator 120' may be configured to generate further (and different) frequency waveforms. For example in some embodiments the timing generator 120' may be configured to generate a sine wave of frequency $f-\delta f$ and a sine wave of frequency $f+\delta f$ and from these be able to calculate two further range determinations. From these further range determinations and the knowledge of the frequencies an unambiguous range (which does not have any potential wrap-round error) may then be output.

Figure 9A:
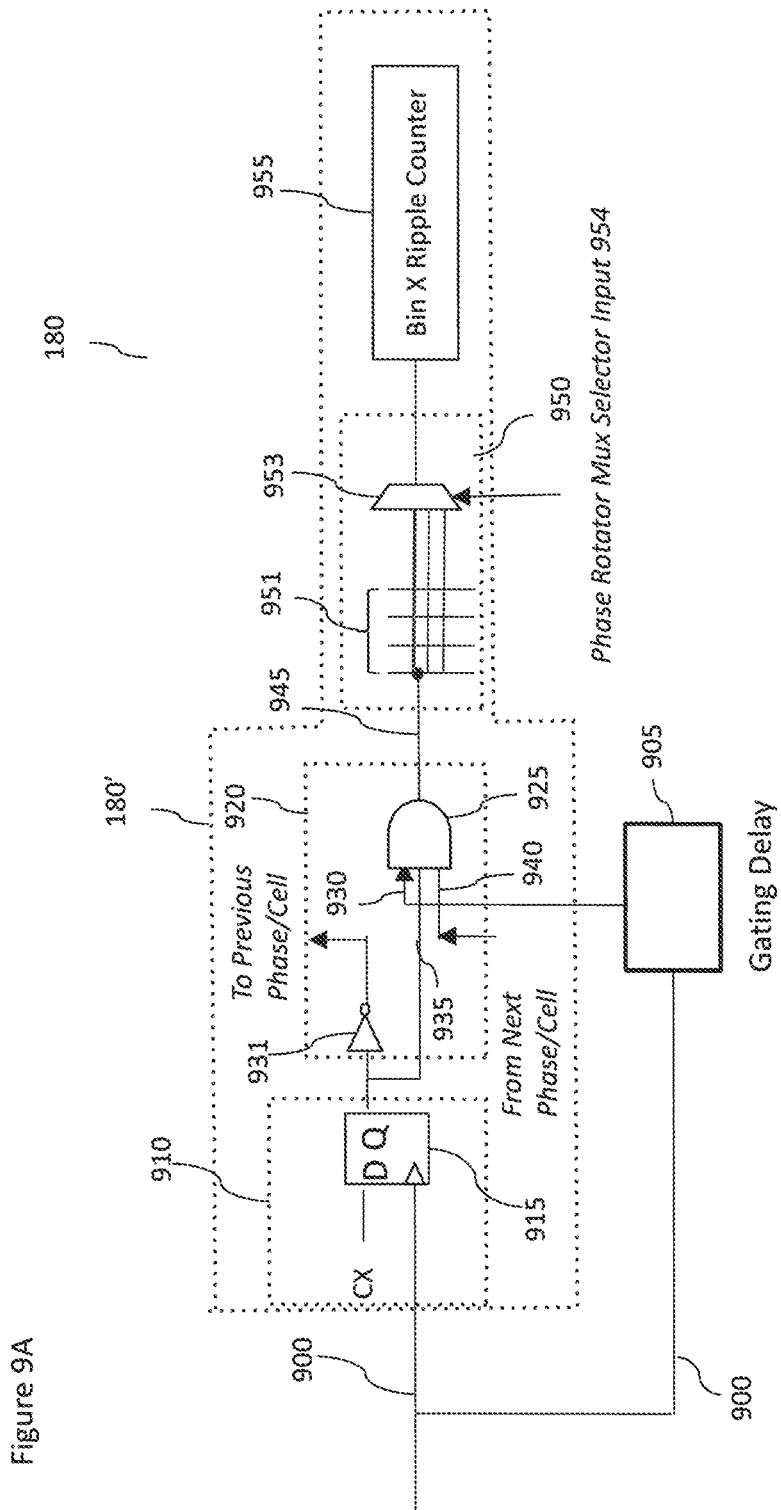
FIG. 9A shows a schematic view of an example building block of the histogram generator shown in FIG. 8.

Reference is now made to FIG. 9A which shows a more detailed view of a building block for components of the histogram generator 180 (or a histogram generator cell 180') as shown in FIG. 8. As discussed with reference to FIG. 8, the histogram generator 180 is configured to receive the combination of SPAD pixels which are shaped, logical OR'ed and then timed based on the timing generator clock signals. Each generator cell 180' may be configured to generate a bin output for the histogram generator 180. Thus a three bin histogram generator may comprise three histogram cells 180', a four bin histogram generator may comprise four histogram cells 180' and so on.

The histogram generator 180 may thus comprise an input 900 receiving the processed SPAD pixel signals. The input 900 may be passed to a delay cell 905 and to a clock sampling flip flop cell 910.

The histogram generator 180 may comprise a delay module 905. The delay module 905 may be configured to receive the input 900 and delay the input signal sufficiently such that a delayed version of the input signal may be used to 'clock' a gated edge detector cell 920.

Each histogram generator cell 180' comprises a clock sampling flip flop cell 910. The clock sampling flip flop cell 910 is configured to sample the clock signal using as a clock as the input 900 (from the pulse shaper or OR tree). The clock sampling flip flop cell 910 is shown in FIG. 9A as comprising a single D-latch 915 (D-flip flop) which has a data input coupled to one of the phase clock input signals $C_x$ and a clock input coupled to the input 900. The phase clock input signal may be one of three (or four or more) depending on the number of bins generated by the histogram generator. Each neighboring phase clock is configured to overlap the previous and next phase clock. Thus, for example, in a four bin histogram generator there are four phase clocks $C_1$, $C_2$, $C_3$, $C_4$, each of which overlaps the previous clock by ¼ of a cycle and thus $C_1$ is substantially the inverse of $C_3$ and $C_2$ is substantially the inverse of $C_4$. The output of the D-latch 915 is output to a gated edge detector cell 920. Thus an output from the cell is generated where on the rising edge of an SPAD event pulse the phase clock signal is positive.

The histogram generator cell further comprises a gated edge detector (or transition detector) cell 920. The gated edge detector cell 920 may comprise an inverter 931 which receives the output of the clock sampling flip flop cell 910 and outputs the inverted clock sampling flip flop cell signal 935 to an AND gate for a previous clock phase gated edge detector cell. The gated edge detector cell 920 further comprises an AND gate 925 which is configured to receive the next clock phase gated edge detector cell invertor signal 940, the current phase clock sampling flip flop cell signal 935, and the delay module output signal as a clock input signal 930. The AND gate 925 may generate an output 945 which is passed to a phase rotator multiplexer 950. In this way, the gated edge detector cell outputs a high state only when a SPAD event is detected between overlapping phase clock signals and therefore is defined only by positive edge triggering. An advantage of this type of edge detection is that only one type of logic is used to define the time periods, namely either PMOS or NMOS gate, making the definition of the time periods more consistent.

The histogram generator cell 180' further comprises a phase rotator multiplexer cell 950. The phase rotator multiplexer cell 950 comprises a network 951 which receives the output of the current phase clock gated edge detector cell 920 and the output of every other phase clock gated edge detector cell and a multiplexer 953 which is configured to receive as inputs the network 951 (and therefore the current phase clock gated edge detector cell 920 and every other phase clock gated edge detector cell) and a selector input 954. The selector input 954 thus selects one of the current phase clock gated edge detector cell or other phase clock gated edge detector cell signals to be output by the multiplexer 953 to a phase bin ripple counter 955.

The histogram generator cell 180' further comprises a phase bin (Bin X) ripple counter 955. The ripple counter 955 is shown receiving as an input the output from the multiplexer 953 and is configured to count the events detected.

Figure 9B:
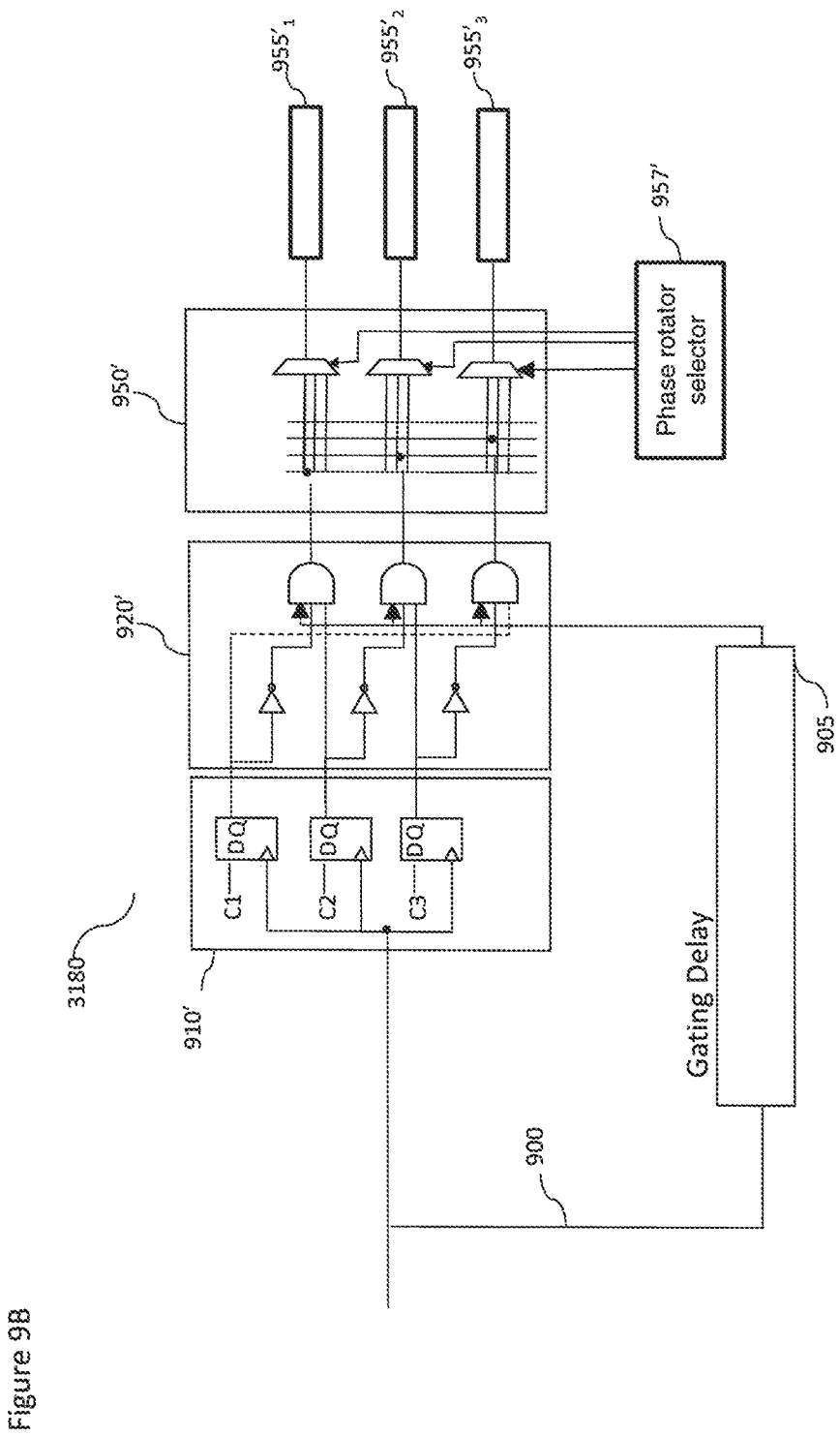
FIGS. 9B and 9C show schematic views of three-bin and four-bin arrangements of the histogram generator shown in FIG. 8 formed from the example building block shown in FIG. 9A.
Figure 9C:
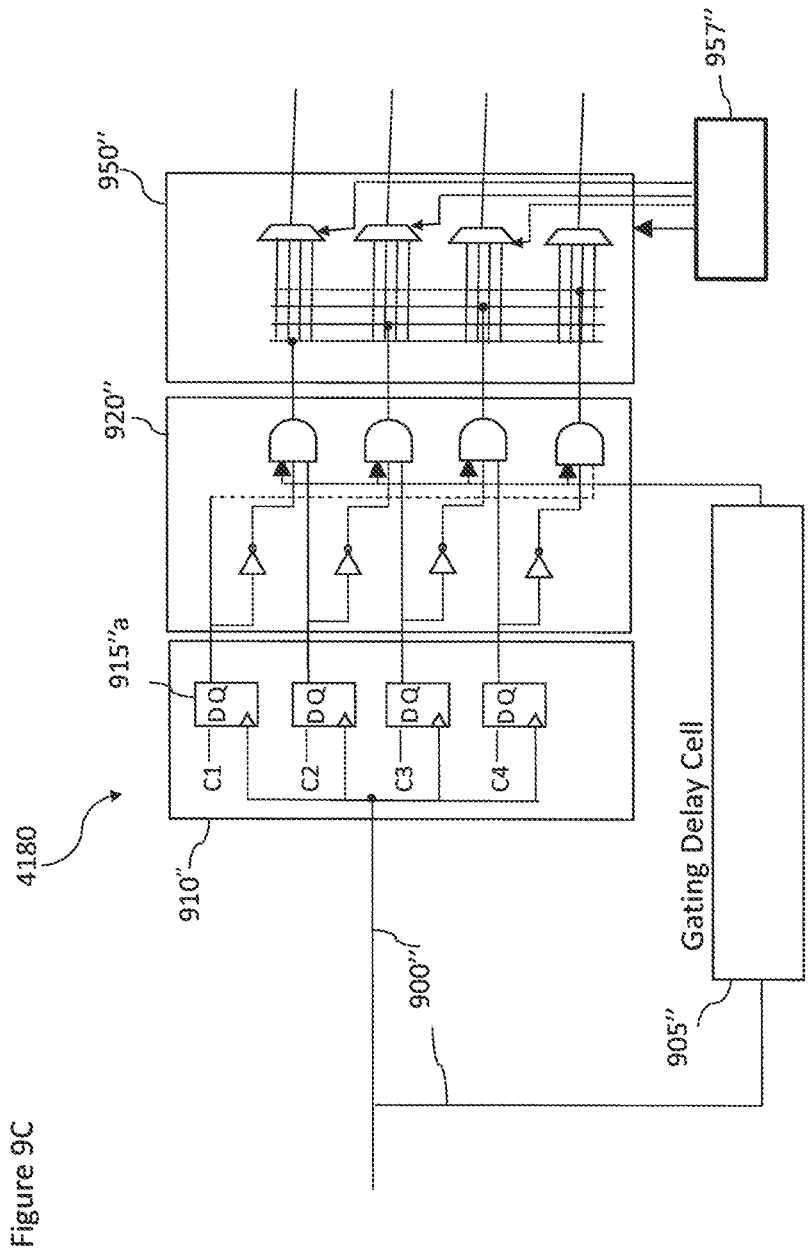

With respect to FIGS. 9B and 9C examples of the three and a four bin histogram generators are shown comprising the histogram generator cell 180' as shown in FIG. 9A.

FIG. 9B shows a three bin histogram generator 3180 which comprises three phases (or rows) of the histogram generator cell 180' such as shown in FIG. 9A. The histogram generator 3180 may thus comprise an input 900. The input 900 may be passed to a delay cell 905 and to a 3 phase clock sampling flip flop 910'.

The three bin histogram generator 3810' may comprise a delay module 905. The delay module 905 may be configured to receive the input 900 signal and delay the signal sufficiently such that a delayed version of the input signal may be used to 'clock' a three phase gated edge detector 920'.

The three bin histogram generator 3180 further comprises three clock sampling flip flop cells to form a three phase clock sampling flip flop 910'. The phase clock input signals are three overlapping phase clocks $C_1, C_2, C_3$. The output of the three phase clock sampling flip flop 910' is output to a three phase clock edge detector cell 920'.

The three bin histogram generator 3180 further comprises three clock gated edge detector (or transition detector) cells to form a three phase clock gated edge detector 920'. The three phase clock gated edge detector 920' may output to the three phase multiplexer 950'.

The three bin histogram generator 3180 further comprises three rotation multiplexer cells to form a three phase clock rotation multiplexer 950'. The three phase rotation multiplexer 950' is configured to output one of the three clock gated edge detector cell outputs to one of the three bin ripple counters $955_1', 955_2', 955_3'$. The three bin histogram generator 3180 further shows a phase rotator/selector 957' configured to control the switching of the multiplexing.

The histogram generator cell further comprises three bin ripple counters $955_1', 955_2', 955_3'$ configured to count the events detected for each of the clock phases.

FIG. 9C shows a four bin histogram generator 4180 which comprises four phases (or rows) of the histogram generator cell such as shown in FIG. 9A. The histogram generator 4180 may thus comprise an input 900. The input 900 may be passed to a delay cell 905 and to a four phase clock sampling flip flop 910''.

The four bin histogram generator 4180 may comprise a delay module 905. The delay module 905 may be configured to receive the input 900 signal and delay this sufficiently such that a delayed version of the input signal may be used to 'clock' or activate a four phase gated edge detector 920'.

Figure 10A:
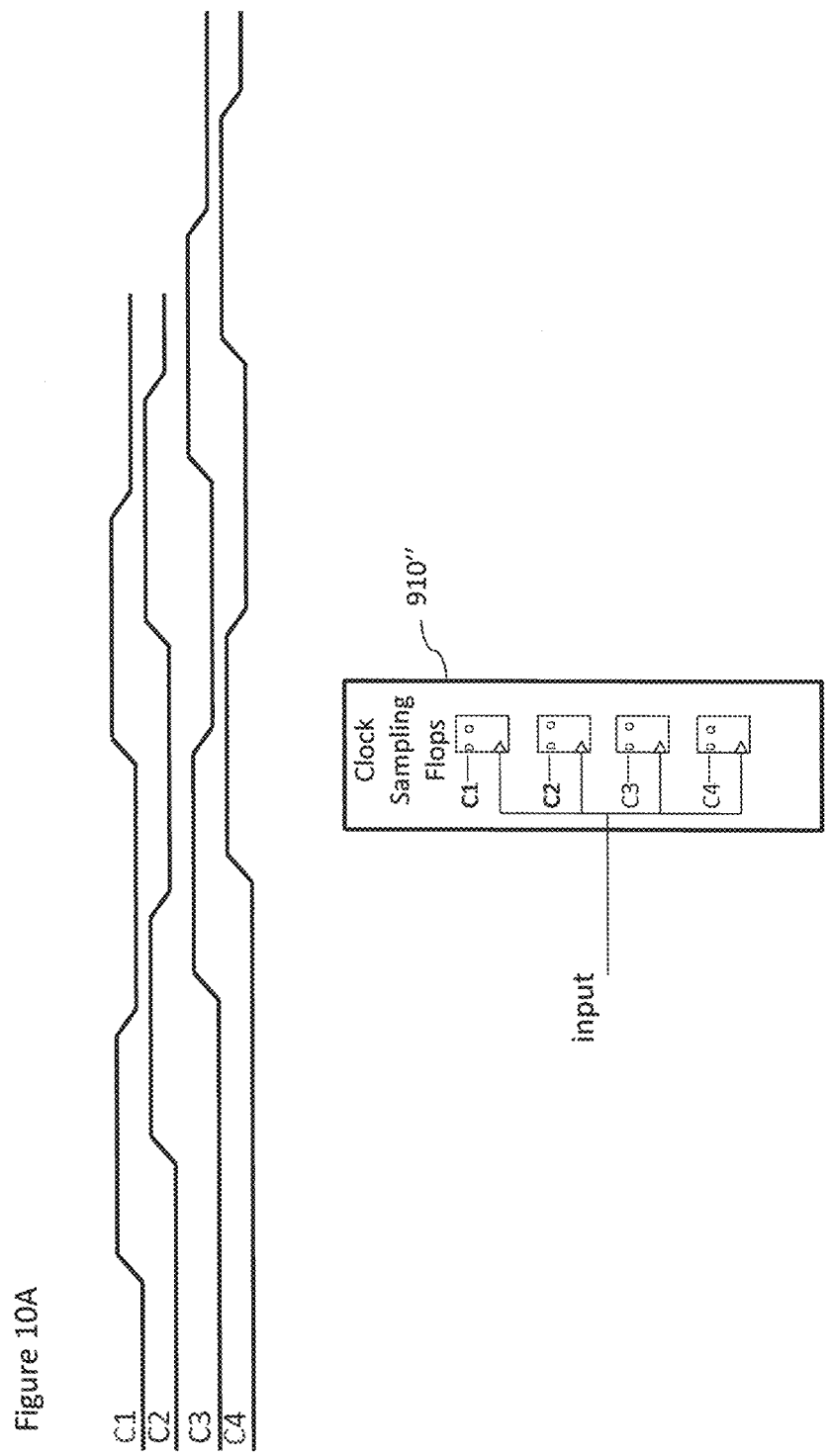
FIG. 10A show example clock signals used in the clock sampling flip flops shown in FIGS. 9A to 9C.

The four bin histogram generator 4180 further comprises four clock sampling flip flop cells to form a four phase clock sampling flip flop 910''. The phase clock input signals are four overlapping phase clocks $C_1, C_2, C_3, C_4$. The output of the four phase clock sampling flip flop 910'' is output to a four phase clock edge detector cell 920''. This for example is shown in FIG. 10A where an example four overlapping phase clocks $C_1, C_2, C_3, C_4$ are shown being used as data inputs for the four phase clock sampling flip flop 910''.

The four bin histogram generator 4180 further comprises four clock gated edge detector (or transition detector) cells to form a four phase clock gated edge detector 920''. The four phase clock gated edge detector 920'' may output to the four phase multiplexer 950''.

The four bin histogram generator 4180 further comprises four phase rotation multiplexer cells to form a four phase rotation multiplexer 950''. The four phase rotation multiplexer 950'' is configured to output one of the four clock gated edge detector cell outputs to one of the four bin ripple counters $955_1'', 955_2'', 955_3'', 955_4''$. The four bin histogram generator 810'' further shows a phase rotator/selector 957'' configured to control the switching of the multiplexing. The concept behind the four phase rotation multiplexer 950'' is shown in further detail in FIG. 10B.

Figure 10B:
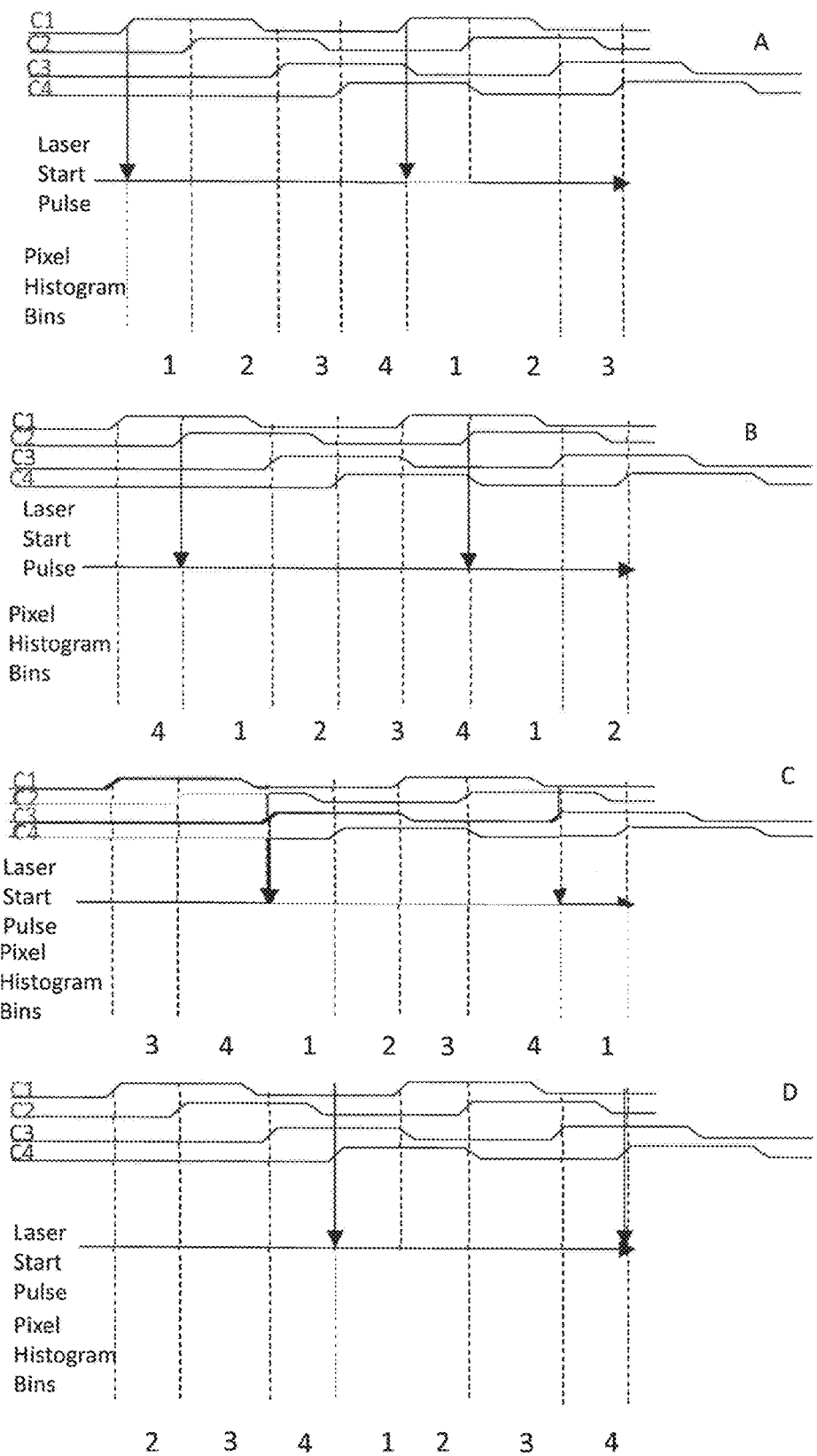
FIG. 10B shows the effect of the phase rotate multiplexes on the clock signals used in the clock sampling flip flops according to some embodiments.

The first part A of FIG. 10B shows a first phase rotation setting whereby the phase rotator/selector 957'' is configured to couple the output of the first edge detector cell (defined by the period between C1 rising and C2 rising) to the first ripple counter, the second edge detector cell (defined by the period between C2 rising and C3 rising) to the second ripple counter, the third edge detector cell (defined by the period between C3 rising and C4 rising) to the third ripple counter and the fourth edge detector cell (defined by the period between C4 rising and C1 rising) to the fourth ripple counter. However, as shown in FIG. 10B part A not all of the periods are the same and thus for example the second phase, the phase marked 2, is shown to be slightly bigger than the other phases. This may cause errors as the probability of detecting an event is greater during the second phase. The solution to any phase clock inconsistency is found in the application of the phase rotator multiplexer 950. The phase rotator multiplexer 950 and shown in FIG. 10B with respect to the four phase rotator multiplexer operates to repeat the histogram generation starting with a different clock phase and as such when all of the clock phases have been rotated for a whole cycle then any inconsistency is averaged out.

Thus, for example, FIG. 10B part B shows a second phase rotation setting wherein the phase rotator/selector 957'' is configured to 'start' the light source cycle starting at the second phase and thus couple the output of the first edge detector cell (defined by the period between C1 rising and C2 rising) to the fourth ripple counter, the second edge detector cell (defined by the period between C2 rising and C3 rising) to the first ripple counter, the third edge detector cell (defined by the period between C3 rising and C4 rising) to the second ripple counter and the fourth edge detector cell (defined by the period between C4 rising and C1 rising) to the third ripple counter.

A further rotation to a third phase rotation setting is shown in FIG. 10B part C wherein the phase rotator/selector 957'' is configured to 'start' the light source cycle starting at the third phase and thus couple the output of the first edge detector cell (defined by the period between C1 rising and C2 rising) to the third ripple counter, the second edge detector cell (defined by the period between C2 rising and C3 rising) to the fourth ripple counter, the third edge detector cell (defined by the period between C3 rising and C4 rising) to the first ripple counter and the fourth edge detector cell (defined by the period between C4 rising and C1 rising) to the second ripple counter.

The final rotation, the fourth phase rotation setting, is shown in FIG. 10B part D. The phase rotator/selector 957'' is configured to 'start' the light source cycle starting at the fourth phase and thus couple the output of the first edge detector cell (defined by the period between C1 rising and C2 rising) to the second ripple counter, the second edge detector cell (defined by the period between C2 rising and C3 rising) to the third ripple counter, the third edge detector cell (defined by the period between C3 rising and C4 rising) to the second ripple counter and the fourth edge detector cell (defined by the period between C4 rising and C1 rising) to the first ripple counter.

Turning to FIG. 11A, a schematic illustration of an example embodiment of the delay module 905 is shown. The pulse shaper circuit 805 is shown to have an input from the SPAD array and an output 900 that feeds into the delay module 905, as discussed with reference to FIG. 8 above. The delay module 905 effectively comprises two delay elements, 1000 and 1005, which introduce time delays, $T_{D2}$ and $T_{D3}$ respectively. The pulse shaper 805 is also annotated with "$T_m$". As will be discussed below, with reference to the timing diagram of FIG. 11B, $T_{D1}$ indicates the length of the pulse created by the pulse shaper circuit.

The significance of these time periods $T_{D1}, T_{D2},$ and $T_{D3}$ are shown in the timing diagram of FIG. 11B, which illustrates the operation of the delay module 905. The signal output 900 of the pulse shaper is shown in the uppermost part of the diagram. The signal is shown to have a length in time of $TD_1$. It is noted that the change in state (from low to high) for the output signal 900 of the pulse shaper is not instantaneous. Rather, as illustrated there is a finite rise time between $t_0$ and $t_1$.

The "sample flip flops" diagram directly below the pulse diagram indicates the activation of a sampling module 910. It is noted that, as can be seen in the sample flip flop diagram, the sampling elements also do not change state instantaneously. However, the time required for the change of state of a sampling flip flop ($t_2$-$t_0$) is smaller than the time required for the change in state of the output signal 900, ($t_1$-$t_0$).

There is an implemented time delay $T_{D2}$ introduced by the first delay element 1000 of the delay module 905, which represents the time required for a pulse 900 to be 'reach' the edge detector module 920 (or in other words for a pulse to pass through the clock sampling flip flops and therefore the difference in time between an initial sampling time 1105 and the logic settling time 1107).

A further implemented time delay $T_{D3}$ is defined from the time 1109 from which the gated edge detector is 'enabled' to enable any pulse to settle within the gated edge detector 920 and thus any pulse generated by the pulse shaper is able to be clocked out of the gate edge detector to the phase rotation multiplexer 950 within the time safety margin 1111 defined from the end of the delay $T_{D3}$ and the PS pulse time.

FIGS. 12A to 12D show various example implementations of the arrangements of four bin histogram generators which may differ from the implementations such as described in FIGS. 9A, 9B and 9C.

Figure 12A:
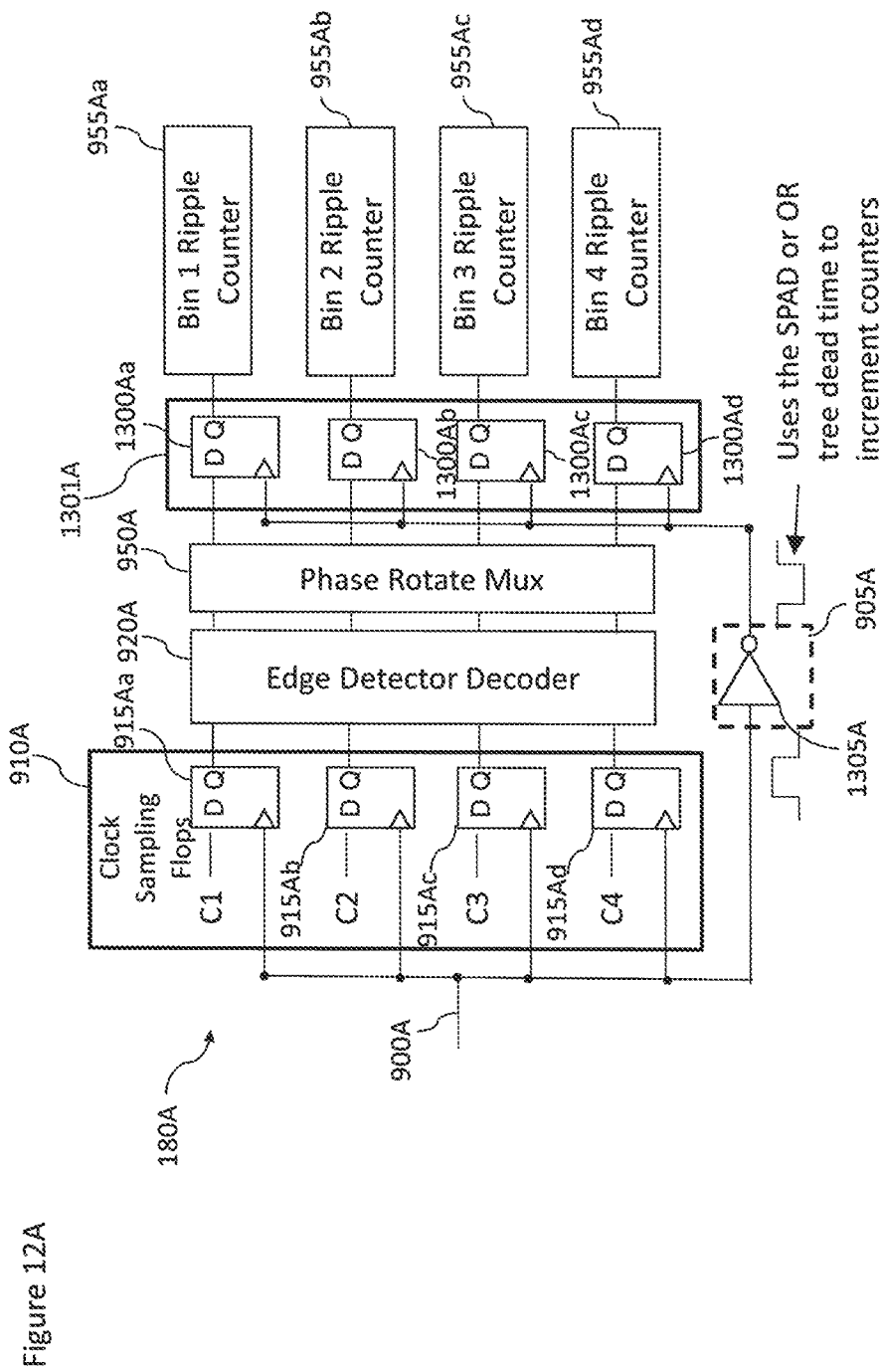
FIGS. 12A, 12B, 12C and 12D show schematic views of implementations of range detecting embodiments.

With respect to the example implementation in FIG. 12A, a first alternative example four bin histogram generator 180A is shown.

The histogram generator 180A may thus comprise an input 900A. The input 900A may be passed to a delay cell 905A and to a clock sampling flip flop 910A.

The histogram generator 180A may comprise a delay module 905A. The delay module 905A may be configured to receive the output of the shaper circuit 805 and delay these inputs sufficiently such that a delayed version of the input may be used to 'clock' the output of the phase rotator multiplexers 950A. Thus, the delay module 905A is configured to generate a delay which enables the detected events to pass through the clock sampling flip flops 910A, the edge detector decoder 920A and the phase rotator multiplexers 950A. The delay module 905A is shown in FIG. 12A comprising an inverter 1305A configured to receive the input 900A. As such, the delay module 905A uses the dead time of the SPAD or the OR tree as the delay time as the falling edge of the SPAD event or the OR tree network output may be used as the rising edge to clock the clock gating stage 1301A and therefore increment the counters.

In the example shown in FIG. 12A, the clock sampling flip flops 910A are configured to sample the four phase clock signals using the input 900A from the pulse shaper. The clock sampling flip flops 910A are shown as four D-latches 915Aa, 915Ab, 915Ac and 915Ad which has a data input coupled to one of the phase clock input signals $C_1$, $C_2$, $C_3$, $C_4$ and a clock input coupled to the input 900A. The output of each D-latch 915Aa, 915Ab, 915Ac and 915Ad is output to the edge detector 920A. Thus, an output from the cell is generated where on the rising edge of an SPAD event pulse the phase clock signal is positive.

The histogram generator 180A further comprises an edge detector (or transition detector) 920A. The edge detector 920A may be configured to identify or determine whether the event was detected between which pair of positive or rising phase clock edges. A difference between the edge detector 920A as shown in FIG. 12A and the edge detector 920 shown in FIGS. 9A to 9C is that the edge detector 920A does not receive an output from the gating delay cell 905A.

Based on the determination of between which pair of positive or rising phase clock edges the event was detected the edge detector 920A is configured to output on one of the four edge interval outputs to a phase rotator multiplexer 950A.

The histogram generator 180A further comprises a phase rotation multiplexer 950A. The phase rotation multiplexer 950A may be similar to the phase rotation multiplexers described above in that it comprises a network which receives the outputs from the edge detector 920A. The multiplexer 950A may further comprise multiplexers configured to receive signals from the network and a selector input and thus selects one of the edge detector outputs to be output by the multiplexer to a clock gating stage 1301A.

The histogram generator 180A further comprises a clock gating stage 1301A which comprises a series of D-latches 1300Aa, 1300Ab, 1300Ac, 1300Ad each of which receives, as a data input, an output from the phase rotation multiplexer 950A and, as a clock input, the output from the delay module 905A and outputs the clock gated phase rotated samples to phase bin ripple counters 955Aa, 955Ab, 955Ac, 955Ad.

The histogram generator 180A further comprises phase bin ripple counters 955Aa, 955Ab, 955Ac, 955Ad. The ripple counters 955Aa, 955Ab, 955Ac, 955Ad are shown receiving, as an input, the outputs from the clock gating stage 1301A and is configured to count the events detected for each bin.

Figure 12B:
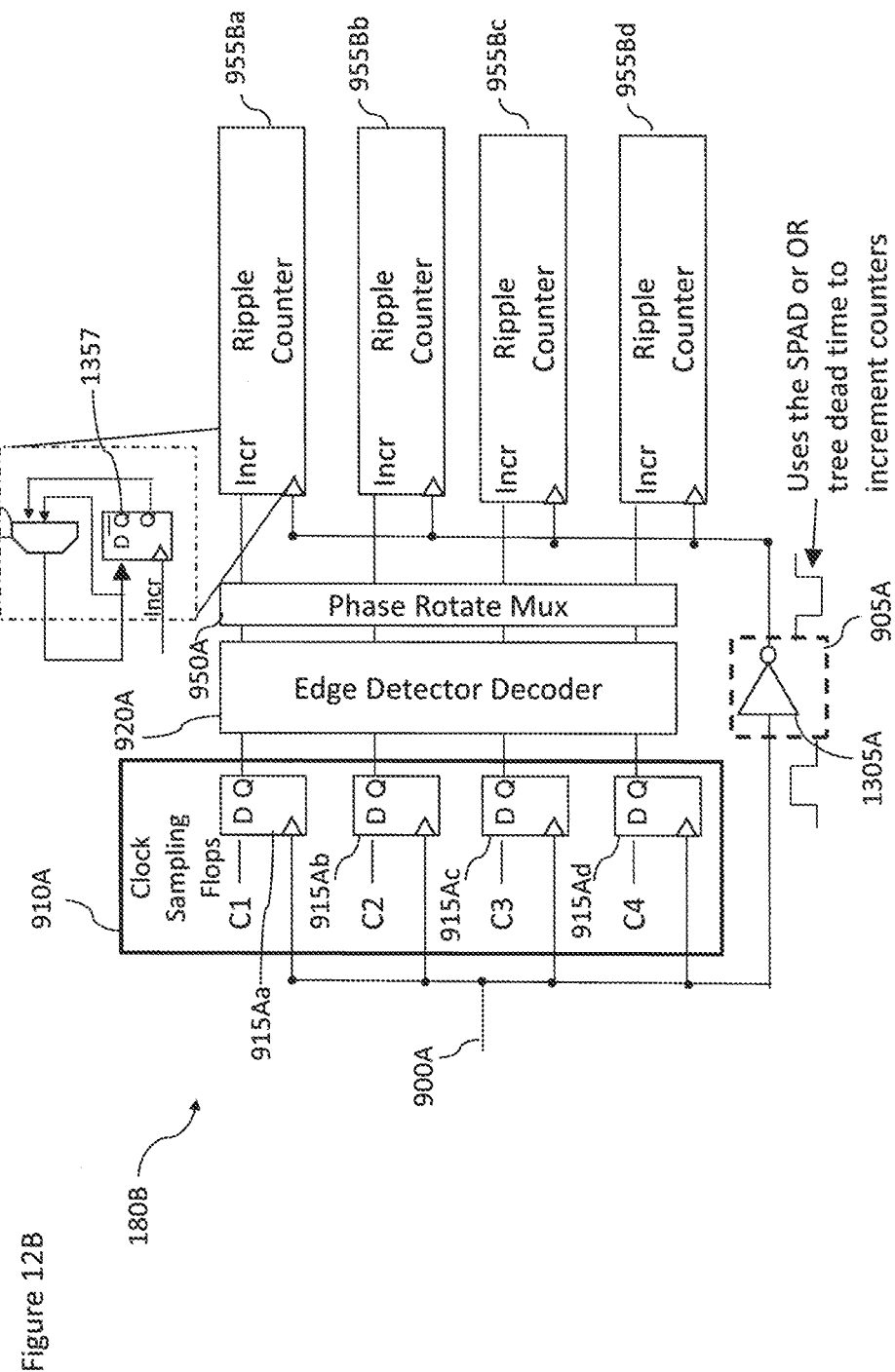

With respect to the example implementation in FIG. 12B, a further alternative example four bin histogram generator 180B is shown. The main difference between the histogram generator 180B as shown in FIG. 12B and the histogram generator 180A shown in FIG. 12A is that the functionality of the clock gating stage functionality is implemented within the ripple counters 955B.

The histogram generator 180B may thus comprise an input 900A. The input 900A may be passed to a delay cell 905A and to a clock sampling flip flop 910A.

The histogram generator may comprise a delay module 905A which may be implemented as an inverter 1305A and function as described previously.

The histogram generator may further comprise clock sampling flip flops 910A configured to sample the four phase clock signals using the input 900A from the pulse shaper. As described above the output of each D-latch 915Aa, 915Ab, 915Ac and 915Ad is output to the edge detector 920A. Thus an output from the cell is generated where on the rising edge of an SPAD event pulse the phase clock signal is positive.

The histogram generator 180B further comprises an edge detector (or transition detector) 920A which performs the same functionality as the edge detector of FIG. 12A as described above.

The histogram generator 180A further comprises a phase rotation multiplexer 950A which performs the same functionality as phase rotation multiplexer 950A of FIG. 12A as described above. However rather than selecting one of the edge detector outputs to be output by the multiplexer to a clock gating stage 1301A the output is passed to a ripple counter 955Ba, 955Bb, 955Bc, 955Bd.

The histogram generator 180B further comprises phase bin ripple counters 955Ba, 955Bb, 955Bc, 955Bd. The ripple counters 955Ba, 955Bb, 955Bc, 955Bd are shown receiving, as a clock input the output from the delay stage 905A and as an increment enable input the outputs from the phase rotation multiplexer 950A and is configured to count the events detected for each bin. Each bin ripple counter 955Ba, 955Bb, 955Bc, 955Bd comprises a flip flop 1357 which is the first bit of the ripple counter and which receives as the clock input the counter 'incr' input (the output of the phase rotator multiplexer 950A) and as a data input the output of a multiplexer 1355. Furthermore the bin ripple counter comprises a multiplexer 1355 which receives as a first input the positive output from the flip flop 1357, a second input the output of the multiplexer 1355 and a selection input of 'increment enable' signal from the output of the delay 905A. The output of the flip flop 1357 may furthermore be passed to the further bits of the ripple counter module. Combined with the multiplexer 1355, this example shows an implementation of a ripple counter that can be enabled or disabled by changing the select input "increment enable" on the multiplexer 1355. The output of the rotation multiplexer 950A connects to the clock input of the flip flop 1357 (marked 'incr').

Figure 12C:
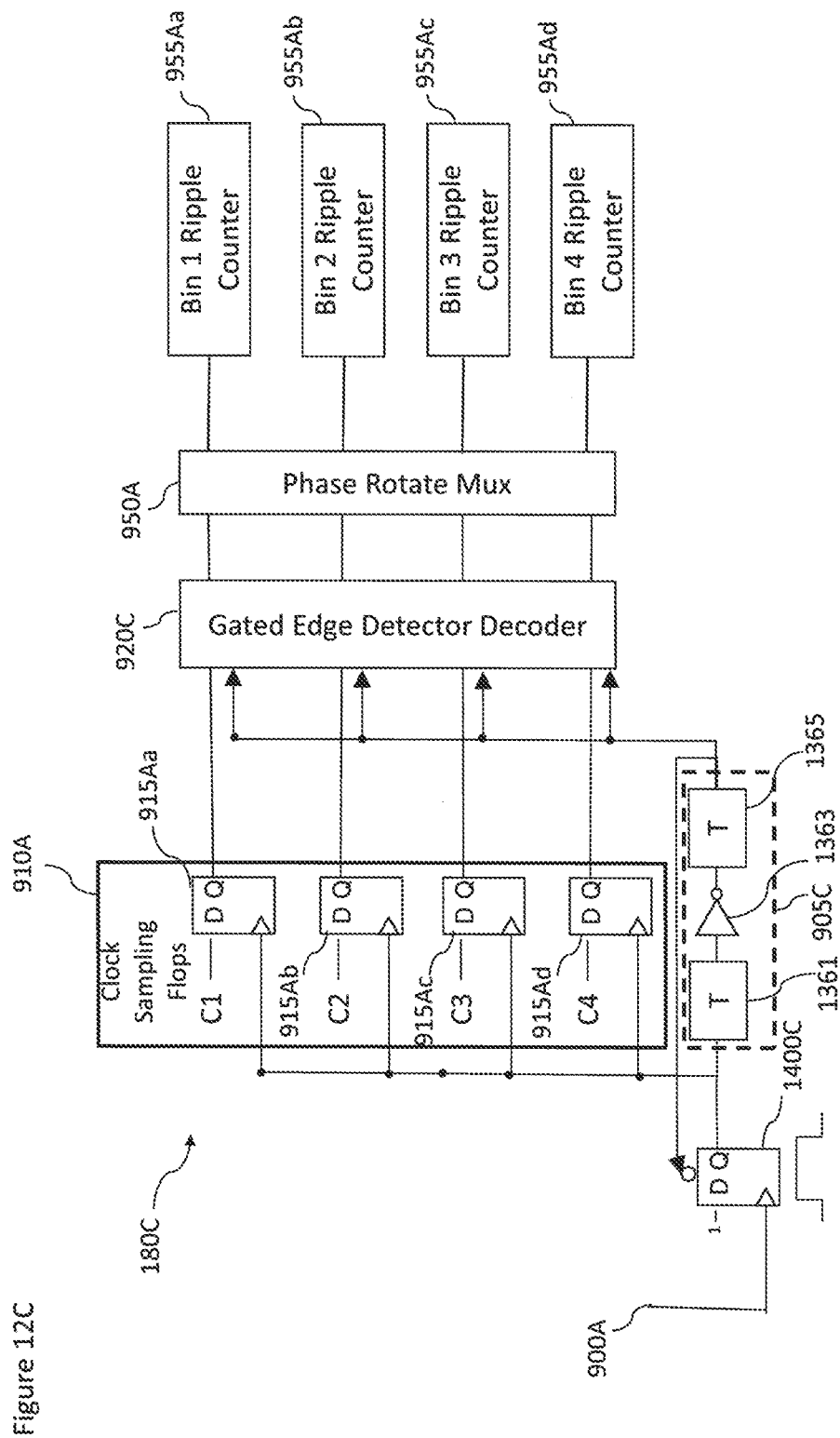

With respect to the example implementation in FIG. 12C, a further alternative four bin histogram generator 180C is shown. The main difference between the histogram generator 180C as shown in FIG. 12C and the histogram generators 180A, 180B shown in FIGS. 12A and 12B is that the edge detector 920A, 920B is a gated edge detector 920C and thus the functionality of the clock gating stage functionality is implemented within the edge detector. Furthermore FIG. 12C shows an alternative delay cell 905C which comprises a pair of delay elements 1361 and 1365 and an inverter 1363 to generate the delay time implicitly using the delay time of the SPAD pulse (if no pulse shaper is used) or the pulse shaper pulse. The delay time is produced from using the negative edge of a pulse coming through the OR tree. The pulse shapers connected as inputs to the OR tree provide this delay "for free", the inverter is used to convert the negative edge to a positive edge. The output of the delay cell 905C furthermore is passed to the gated edge detector 920C as the clock input.

The histogram generator 180C furthermore comprises a flip flop 1400C which is configured to receive the input 900A from the SPAD pixels as a clock input and has a data input which is set high and thus outputs a high value when an event is output from the SPAD. The positive output from the flip flop 1400C is sent as the input for the clock sampling flip flops 910A and to the delay cell 905C. The flip flop 1400C furthermore comprises a reset input which receives the output from the delay cell 905C and as such each detected event creates a pulse with a width defined by the delay cell time delay. In other words, the flip flop 1400C and the two delay cells function as the pulse shaper or "pulse extender". The flip flop latches high, then the delay cells are activated which reset the flip flop providing a guaranteed high time of the pulse (to latch the clock sampling flip flops) and a guaranteed low time (to reset the flip flop 1400C).

The histogram generator 180C may further comprise clock sampling flip flops 910A configured to sample the four phase clock signals using the output from the flip flop 1400C. As described above the output of each D-latch 915Aa, 915Ab, 915Ac and 915Ad is output to a gated edge detector 920C. Thus, an output from the cell is generated where on the rising edge of an SPAD event pulse, the phase clock signal is positive and the preceding phase clock signal is negative.

The histogram generator 180C further comprises a gated edge detector (or transition detector) 920C which performs the same functionality as the edge detector 920A of FIG. 12A as described above but is gated by the output of the delay cell 905C. In other words the gated edge detector 920C is similar to the gated edge detector described in FIGS. 9A to 9C.

The histogram generator 180C further comprises a phase rotation multiplexer 950A which performs the same functionality as phase rotation multiplexer 950A of FIGS. 12A and 12B as described above. However, rather than selecting one of the gated edge detector outputs to be output by the multiplexer to a clock gating stage the output is passed to a ripple counter 955Aa, 955Ab, 955Ac, 955Ad.

The histogram generator 180C further comprises phase bin ripple counters 955Aa, 955Ab, 955Ac, 955Ad. The ripple counters 955Aa, 955Ab, 955Ac, 955Ad are shown receiving the outputs from the phase rotation multiplexer 950A and are configured to count the events detected for each bin.

Figure 12D:
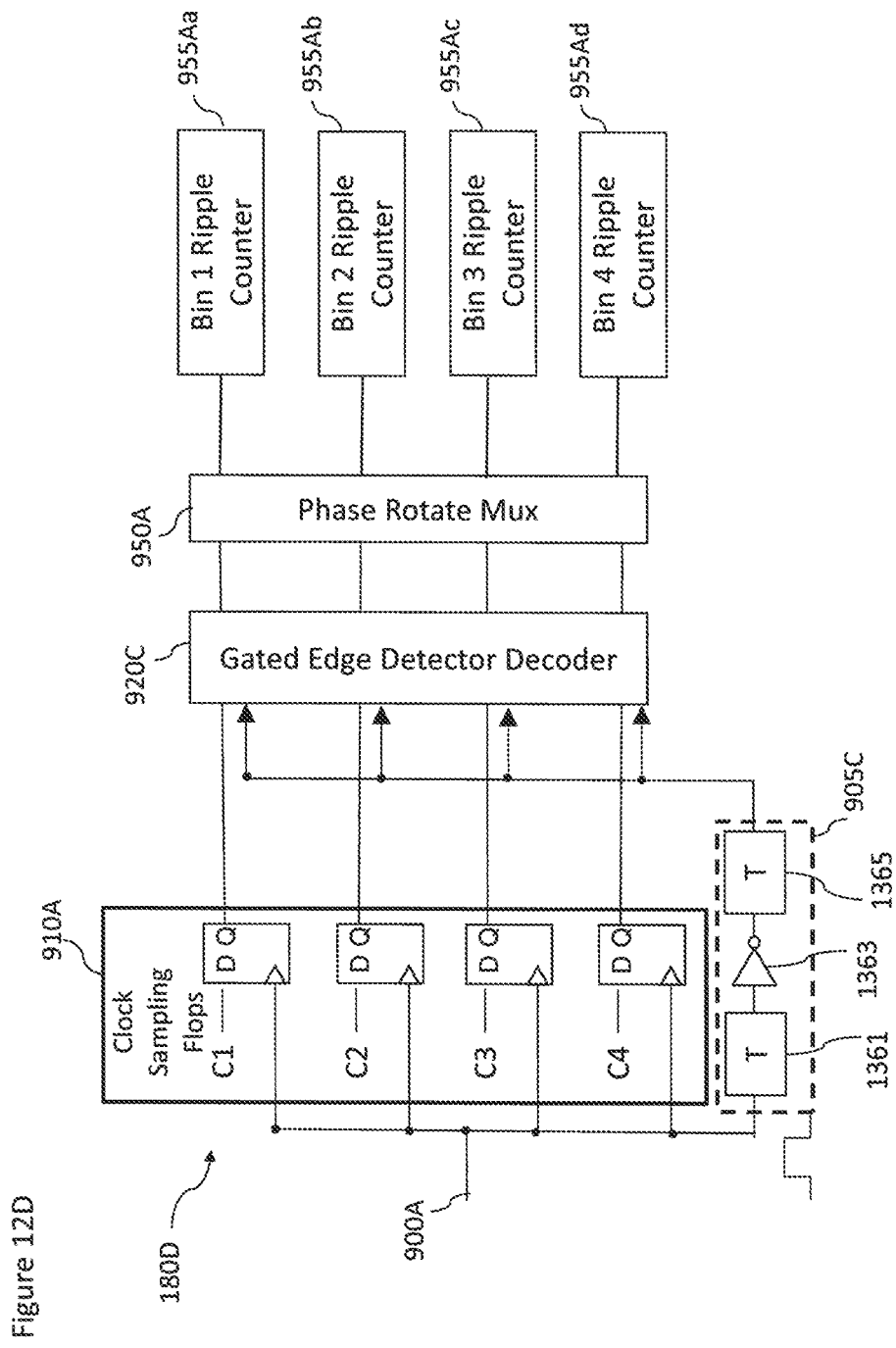

FIG. 12D shows a further alternative example of a four bin histogram generator 180D. The main difference between the histogram generator 180D as shown in FIG. 12D and the histogram generator 180C shown in FIG. 12C is that the resettable flip flop 1400C is not implemented in this example. Thus FIG. 12D shows the alternative delay cell 905C which comprises a pair of delay elements 1361 and 1365 and an inverter 1363 to generate the delay time. The output of the delay cell 905C furthermore is passed to the gated edge detector 920C as the clock input.

The histogram generator 180D furthermore is configured to receive the input 900A from the pulse shaper and which is sent as the input for the clock sampling flip flops 910A and to the delay cell 905C.

The histogram generator 180D may further comprise clock sampling flip flops 910A configured to sample the four phase clock signals using the input signal 900A. As described above the output of each D-latch is output to a gated edge detector 920C. Thus an output from the cell is generated where on the rising edge of an SPAD event pulse, the phase clock signal is positive and the preceding phase clock signal is negative.

The histogram generator 180D further comprises a gated edge detector (or transition detector) 920C which performs the same functionality as the edge detector 920A of FIG. 12A as described above but is gated by the output of the delay cell 905C. In other words the gated edge detector 920C is similar to the gated edge detector described in FIGS. 9A to 9C.

The histogram generator 180D further comprises a phase rotation multiplexer 950A which performs the same functionality as phase rotation multiplexer 950A of FIGS. 12A and 12B as described above. However, rather than selecting one of the gated edge detector outputs to be output by the multiplexer to a clock gating stage the output is passed to a ripple counter 955Aa, 955Ab, 955Ac, 955Ad.

The histogram generator 180D further comprises phase bin ripple counters 955Aa, 955Ab, 955Ac, 955Ad. The ripple counters 955Aa, 955Ab, 955Ac, 955Ad are shown receiving the outputs from the phase rotation multiplexer 950A and are configured to count the events detected for each bin.

Figure 13A:
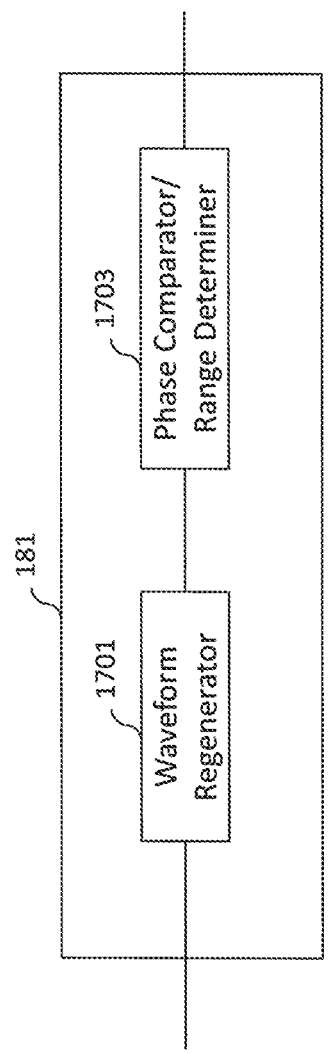
FIG. 13A shows an example histogram processor in further detail.

With respect to FIG. 13A an example of a histogram processor 181 is shown in further detail. In some embodiments the histogram processor 181 comprises a signal or waveform regenerator 1701, which receives the bin count values and maps the values to an expected waveform. For example, in some embodiments where the timing generator 120' is configured to generate a sine wave to modulate the light source 125', then the signal regenerator 1701 is configured to receive the three (or four or other number) bin values and map these to a sine wave. This regenerated waveform may then be passed to a phase comparator/range determiner 1703.

The histogram processor 181 may further comprise a phase comparator/range determiner 1703 which receives the regenerated waveform and compares the regenerated waveform against the original waveform to determine a phase difference and from this comparison determine the time and range distance.

With respect to FIG. 13B an example 3 and 4 bin calculation is shown. The 4 bin example has bin values A, B, C, and D and the range value, Time of flight intensity 1705, and Baseline 1707 may be determined by $$\text{Range} = \text{period} * \text{atan2}\left(\frac{\text{Im}}{\text{Re}}\right) = \text{atan2}\left(\frac{B-D}{A-C}\right)$$

$$TOF\ \text{Intensity} = \frac{\sqrt{(D-B)^2 + (C-A)^2}}{2}$$

$$\text{Baseline} = \frac{A+B+C+D}{4}.$$

The 3 bin example has bin values A, B, and C and the range value, Time of flight intensity 1705, and Baseline 1707 may be determined by $$\text{Re} = A - 0.5 * B - 0.5 * C$$

$$\text{Im} = 0.866 * B - 0.866 * C$$

$$\text{Range} = \text{period} * \text{atan2}\left(\frac{\text{Im}}{\text{Re}}\right)$$

$$TOF\ \text{Intensity} = \frac{\sqrt{(A - 0.5*B - 0.5*C)^2 + (0.866*B - 0.866*C)^2}}{2}$$

$$\text{Baseline} = \frac{A+B+C}{3}.$$

However the phase comparator/range determination may be performed using any suitable method such as look up tables.

Using a single waveform frequency may, in some circumstances, provide an ambiguous range result because of range overlap. This, for example, occurs because more than one range value may be mapped to a phase difference value. To overcome this ambiguous range value in some embodiments the timing generator may perform a range determination for more than one frequency waveform.

Figure 13C:
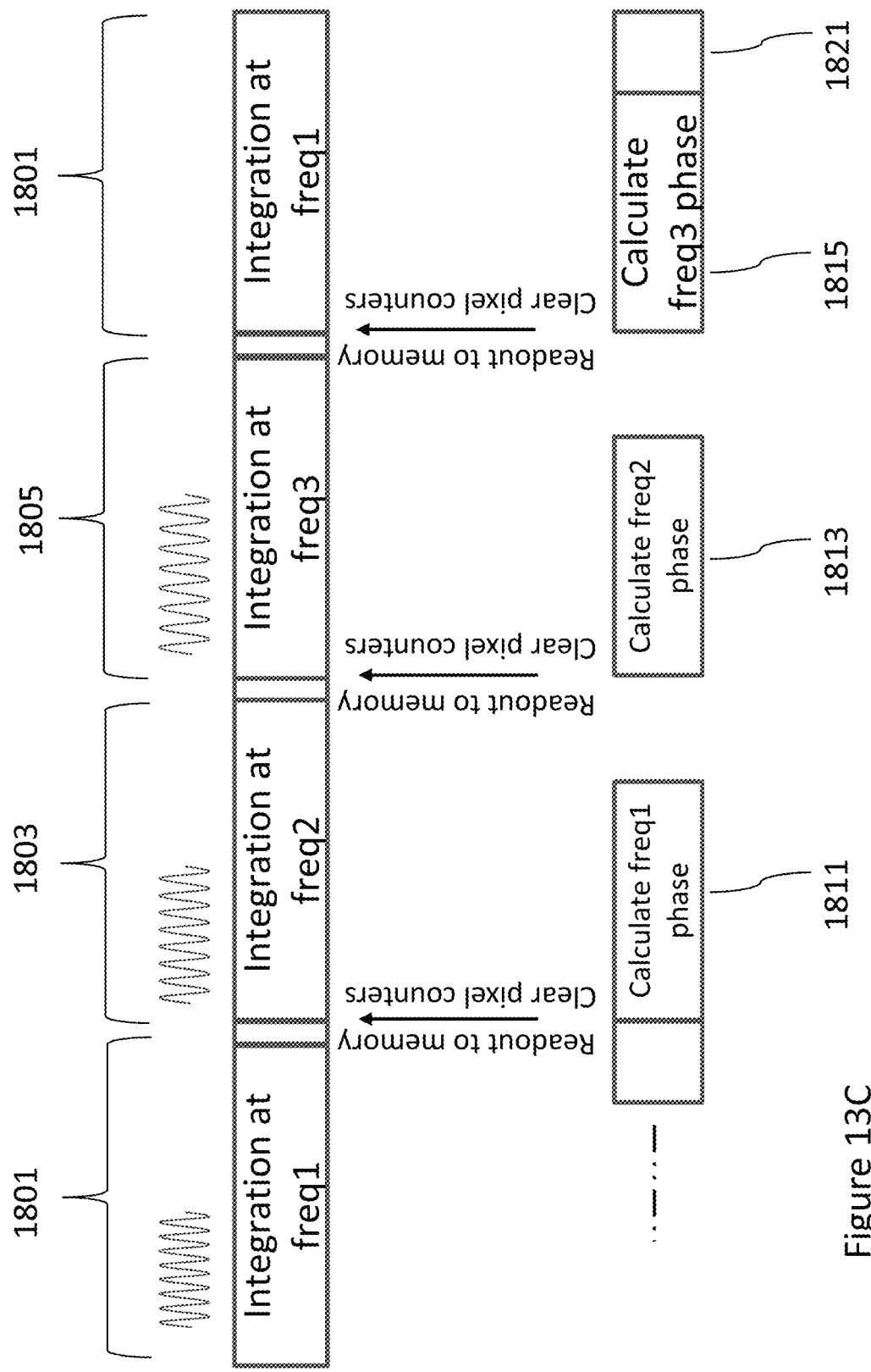
FIGS. 13C and 13D shows example methods for implementing three and four different waveform frequencies to allow for range overlap according to some embodiments.

FIG. 13C, for example, shows an example wherein a first frequency integration (histogram determination) 1801 is performed for a first frequency, then a second frequency integration (histogram determination) 1803 is performed for a second frequency and finally in the cycle a third frequency integration (histogram determination) 1805 is performed for a third frequency. The cycle may then be repeated as shown in FIG. 13C by a further first frequency integration 1801 following the third frequency integration 1805.

Following the end of the first frequency integration 1801, the histogram values may be read out to memory and the pixel counters (ripple counters) reset. Furthermore, the histogram values used to calculate the phase of the first frequency histogram values (in other words the phase difference for the first frequency) 1811. Following the end of the second frequency integration 1803, the histogram values may also be read out to memory and the pixel counters (ripple counters) reset. Furthermore, the histogram values used to calculate the phase of the second frequency histogram values (in other words the phase difference for the second frequency) 1813. Following the end of the third frequency integration 1805, the histogram values may also be read out to memory and the pixel counters (ripple counters) reset. Furthermore, the histogram values used to calculate the phase of the third frequency histogram values (in other words the phase difference for the third frequency) 1815.

Having determined phase values for all three frequencies these may then be used to determine an unambiguous range value 1821.

Figure 13D:
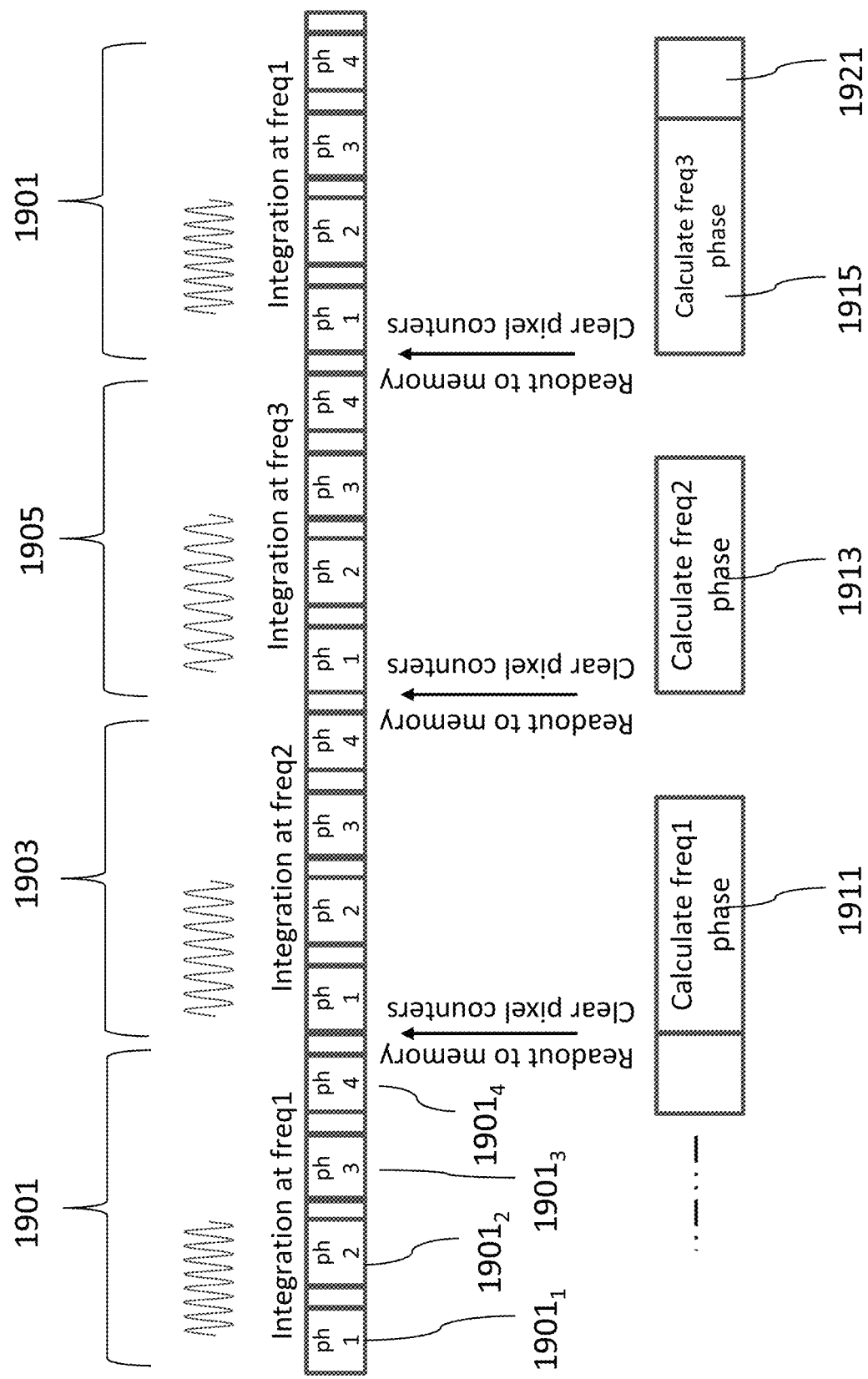

FIG. 13D furthermore shows a three frequency example where within each frequency a phase rotation operation is visible. For example, a first frequency integration (histogram determination) 1901 is performed for a first frequency, but within the first frequency integration is a first phase $1901_1$, a second phase $1901_2$, a third phase $1901_3$, and a fourth phase $1901_4$, then a second frequency integration (histogram determination) 1803 is performed for a second frequency, but within the second frequency integration is a first phase, a second phase, a third phase, and a fourth phase, and finally in the cycle a third frequency integration (histogram determination) 1805 is performed for a third frequency but within the third frequency integration is a first phase, a second phase, a third phase, and a fourth phase. The cycle may then be repeated as shown in FIG. 13D by a further first frequency integration 1901 following the third frequency integration 1905.

Following the end of the first frequency integration 1901, the histogram values may be read out to memory and the pixel counters (ripple counters) reset. Furthermore, the histogram values may be used to calculate the phase of the first frequency histogram values (in other words the phase difference for the first frequency) 1911. Following the end of the second frequency integration 1903, the histogram values may also be read out to memory and the pixel counters (ripple counters) reset. Furthermore, the histogram values may be used to calculate the phase of the second frequency histogram values (in other words the phase difference for the second frequency) 1913. Following the end of the third frequency integration 1905, the histogram values may also be read out to memory and the pixel counters (ripple counters) reset. Furthermore, the histogram values may be used to calculate the phase of the third frequency histogram values (in other words the phase difference for the third frequency) 1915.

Having determined phase values for all three frequencies these may then be used to determine an unambiguous range value 1921.

Figure 14:
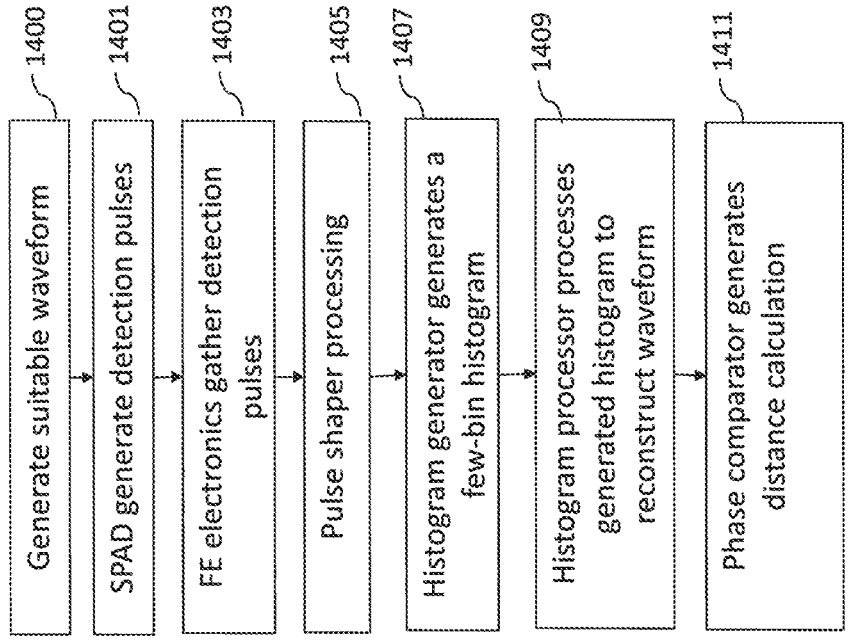
FIG. 14 shows a flowchart illustrating the process implemented within the range detector as shown in FIG. 8.

Turning to FIG. 14, a flowchart summarizing the process implemented within the range detector in accordance with some of the previously described embodiments is shown.

At step 1400, the Timing generator generates a suitable waveform and passes it to the light source.

At step 1401, the SPAD array generates detection pulses which are based on the object range and the waveform.

At step 1403, the Front end electronics gather the detection pulses and pass them to a pulse shaper.

At step 1405, the pulse shaper performs pulse shaping and passes the pulses to the few bin histogram generator to generate the histogram bins.

At step 1407, the histogram generator generates the few histogram bins.

At step 1409, the histogram processor reconstructs a waveform and determines the phase (difference) of the reconstructed waveform.

At step 1411, the histogram processor then furthermore determines a range based on the phase (difference).

Some embodiments may use other sensors, instead of SPADs.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

The invention claimed is:

1. A circuit, comprising:
an array of photodetector elements configured to generate an output signal which comprises a series of photon detections;
a first sampling circuit configured to sample a first clock signal in response to said output signal and output a first sample signal;
a second sampling circuit configured to sample a second clock signal in response to said output signal and output a second sample signal;
wherein the first and second clock signals are offset from each other in phase;
a delay circuit configured to generate a delayed signal from said output signal;
a first edge detection circuit configured to assert a first detection signal in response to a first logical combining of the first sample signal, the second sample signal and the delayed signal; and
a first ripple counter configured to increment a count in response to assertion of the first detection signal.

2. The circuit of claim 1, wherein the first logical combining is a logical AND-ing of a complement of the first sample signal, the second sample signal and the delayed signal.

3. The circuit of claim 1, further comprising:
a third sampling circuit configured to sample a third clock signal in response to said output signal and output a third sample signal;
wherein the first, second and third clock signals are offset from each other in phase;
a second edge detection circuit configured to assert a second detection signal in response to a second logical combining of the first sample signal, the third sample signal and the delayed signal; and
a second ripple counter configured to increment a count in response to assertion of the second detection signal.

4. The circuit of claim 3:
wherein the first logical combining is a logical AND-ing of a complement of the first sample signal, the second sample signal and the delayed signal; and
wherein the second logical combining is a logical AND-ing of a complement of the third sample signal, the first sample signal and the delayed signal.

5. The circuit of claim 3, further comprising a multiplexing circuit having inputs coupled to receive the first and second detection signals and outputs coupled to inputs of the first and second counter circuit.

6. The circuit of claim 3, further comprising:
a light source configured to generate emitted light modulated by a control signal in accordance with a light source cycle;
wherein said array of photodetector elements is configured to detect said emitted light following reflection by an object; and
wherein said multiplexing circuit is controlled to selectively couple the first and second detection signals to inputs of the first and second counter circuits in response to said light source cycle.

7. The circuit of claim 3, further comprising:
a third edge detection circuit configured to assert a third detection signal in response to a third logical combining of the second sample signal, the third sample signal and the delayed signal; and
a third ripple counter configured to increment a count in response to assertion of the third detection signal.

8. The circuit of claim 7:
wherein the first logical combining is a logical AND-ing of a complement of the first sample signal, the second sample signal and the delayed signal;
wherein the second logical combining is a logical AND-ing of a complement of the third sample signal, the first sample signal and the delayed signal; and
wherein the third logical combining is a logical AND-ing of a complement of the second sample signal, the third sample signal and the delayed signal.

9. The circuit of claim 7, further comprising a multiplexing circuit having inputs coupled to receive the first, second and third detection signals and outputs coupled to inputs of the first, second and third counter circuits.

10. The circuit of claim 7, further comprising:
a light source configured to generate emitted light modulated by a control signal in accordance with a light source cycle;
wherein said array of photodetector elements is configured to detect said emitted light following reflection by an object; and
wherein said multiplexing circuit is controlled to selectively couple the first, second and third detection signals to inputs of the first, second and third counter circuits in response to said light source cycle.

11. The circuit of claim 1, further comprising a multiplexing circuit having inputs coupled to receive the first detection signal and other detection signals and an output coupled to an input of the first counter circuit, wherein the multiplexing circuit is configured, in response to a selection signal, to couple a selected one of the first detection signal and other detection signals to the input of the first counter circuit.

12. The circuit of claim 1, wherein the phase offset first and second clock signals partially overlap each other, and wherein the first edge detection circuit asserts the first detection signal when a photon detection indicated by the delayed signal occurs during the partial overlap of the first and second clock signals.

13. The circuit of claim 1, further comprising:
a light source configured to generate emitted light modulated by a control signal;
wherein said array of photodetector elements is configured to detect said emitted light following reflection by an object.

14. A circuit, comprising:
an array of photodetector elements configured to generate an output signal which comprises a series of photon detections;

a first sampling circuit configured to sample a first clock signal in response to said output signal and output a first sample signal;

a second sampling circuit configured to sample a second clock signal in response to said output signal and output a second sample signal;

a third sampling circuit configured to sample a third clock signal in response to said output signal and output a third sample signal;

wherein the first, second and third clock signals are offset from each other in phase;

a delay circuit configured to generate a delayed signal from said output signal;

a first edge detection circuit configured to assert a first detection signal in response to a first logical combining of the first sample signal, the second sample signal and the delayed signal;

a second edge detection circuit configured to assert a second detection signal in response to a first logical combining of the second sample signal, the third sample signal and the delayed signal;

a multiplexing circuit having first and second inputs configured to receive the first and second detection signals, respectively, and first and second outputs;

a first ripple counter configured to increment a count in response to a first detection signal generated at the first output of the multiplexing circuit; and a second ripple counter configured to increment a count in response to a second detection signal generated at the second output of the multiplexing circuit;

wherein the multiplexing circuit is configured, in response to a selection signal, to selectively couple the first and second detection signals to the first and second counter circuits.

15. The circuit of claim 14:

wherein the first logical combining is a logical AND-ing of a complement of the first sample signal, the second sample signal and the delayed signal; and wherein the second logical combining is a logical AND-ing of a complement of the second sample signal, the third sample signal and the delayed signal.

16. The circuit of claim 14, further comprising:

a third edge detection circuit configured to assert a third detection signal in response to a third logical combining of the first sample signal, the third sample signal and the delayed signal;

wherein the multiplexing circuit further has a third input configured to receive the third detection signal and a third output; and a third ripple counter configured to increment a count in response to a third detection signal generated at the third output of the multiplexing circuit.

17. The circuit of claim 16, wherein the multiplexing circuit is configured, in response to the selection signal, to selectively couple the first, second and third detection signals to the first, second and third counter circuits.

18. The circuit of claim 16:

wherein the first logical combining is a logical AND-ing of a complement of the first sample signal, the second sample signal and the delayed signal;

wherein the second logical combining is a logical AND-ing of a complement of the second sample signal, the third sample signal and the delayed signal; and wherein the third logical combining is a logical AND-ing of a complement of the third sample signal, the first sample signal and the delayed signal.

19. The circuit of claim 14, wherein the phase offset first and second clock signals partially overlap each other and wherein the phase offset second and third clock signals partially overlap each other.

20. The circuit of claim 14, further comprising:

a light source configured to generate emitted light modulated by a control signal in accordance with a light source cycle;

wherein said array of photodetector elements is configured to detect said emitted light following reflection by an object; and wherein said selection signal controls the multiplexing circuit to selectively couple the first and second detection signals to inputs of the first and second counter circuits in response to said light source cycle.

* * * * *